(12) United States Patent
Kurokami et al.

(10) Patent No.: US 6,311,137 B1
(45) Date of Patent: Oct. 30, 2001

(54) INFORMATION DISPLAY APPARATUS, INFORMATION RELAY APPARATUS USED IN POWER GENERATION SYSTEM, INFORMATION DISPLAY METHOD AND INFORMATION RELAY METHOD, AND INFORMATION TRANSMISSION METHOD

(75) Inventors: Seiji Kurokami, Kyotanabe; Naoki Manabe; Nobuyoshi Takehara, both of Kyoto-fu, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/492,339

(22) Filed: Jan. 27, 2000

(30) Foreign Application Priority Data

Jan. 27, 1999 (JP) .................................. 11-018892
Jan. 20, 2000 (JP) .................................. 12-011856

(51) Int. Cl.$^7$ .............................. G06F 19/00; H02M 7/00
(52) U.S. Cl. .............................. 702/60; 702/65; 363/74; 363/79
(58) Field of Search .................... 702/57, 60, 64, 702/65, 74; 363/78, 79, 80; 323/906, 299; 341/110, 126, 144

(56) References Cited

U.S. PATENT DOCUMENTS

| | | | | |
|---|---|---|---|---|
| 5,654,883 | * | 8/1997 | Takehara et al. | 363/79 |
| 5,682,305 | * | 10/1997 | Kurokami et al. | 363/79 |
| 5,838,148 | * | 11/1998 | Kurokami et al. | 323/906 |
| 5,869,956 | * | 2/1999 | Nagao et al. | 363/79 |
| 5,923,158 | * | 7/1999 | Kurokami et al. | 363/79 |
| 5,955,885 | * | 9/1999 | Kurokami et al. | 324/426 |

* cited by examiner

Primary Examiner—Marc S. Hoff
Assistant Examiner—Bryan Bui
(74) Attorney, Agent, or Firm—Fitzpatrick, Cella, Harper & Scinto

(57) ABSTRACT

To display the sum of power generation in a photovoltaic power generation system having a plurality of independently-operating inverters in real time, an information display device receives information indicative of amounts of power generation respectively outputted from the plurality of inverters, calculates the sum of power generation in the plural inverters based on the received information, and displays the result of calculation.

34 Claims, 17 Drawing Sheets

F I G. 5
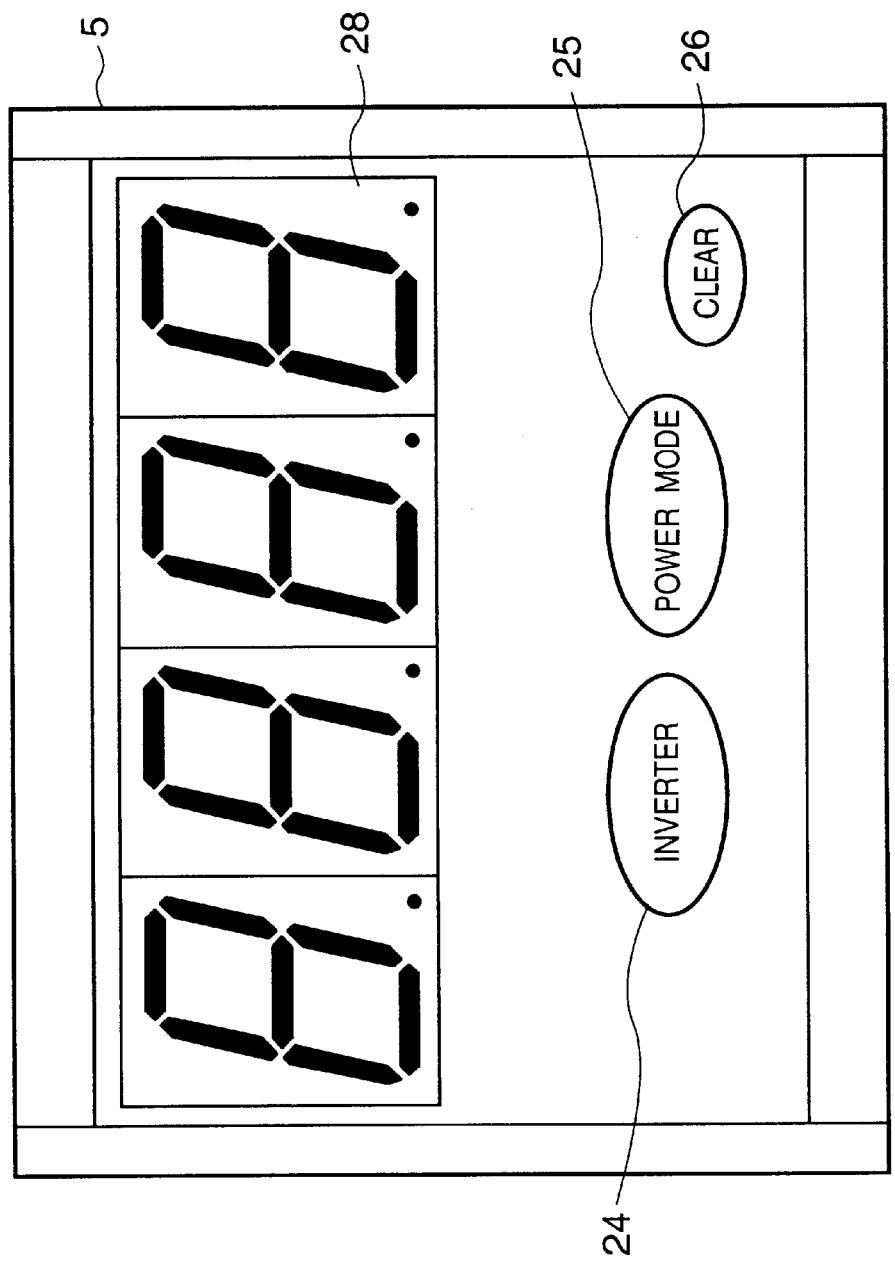

FIG. 16

| FULL SCALE SETTING | FULL SCALE VALUE | FREQUENCY | DUTY |
|---|---|---|---|
| 1 | 4kW | 25Hz | 20% |
| 2 | 8kW | 25Hz | 40% |
| 3 | 16kW | 25Hz | 60% |
| 4 | 32kW | 25Hz | 80% |

FIG. 17

| FULL SCALE SETTING | FREQUENCY | POWER VALUE | |
| | | DUTY 10% | DUTY 90% |
|---|---|---|---|
| 1 | 200Hz | 0W | 4kW |
| 2 | 200Hz | 0W | 8kW |
| 3 | 200Hz | 0W | 16kW |
| 4 | 200Hz | 0W | 32kW |

INFORMATION DISPLAY APPARATUS, INFORMATION RELAY APPARATUS USED IN POWER GENERATION SYSTEM, INFORMATION DISPLAY METHOD AND INFORMATION RELAY METHOD, AND INFORMATION TRANSMISSION METHOD

BACKGROUND OF THE INVENTION

1. Field of the Invention

The present invention relates to an information display apparatus to display information on the amount of power generation and the like and an information relay apparatus to relay the information, used in a photovoltaic power generation system or the like, an information display method and an information relay method, and an information transmission method.

2. Description of Related Art

As a representative photovoltaic power generation system, a system-interconnection type system which is interconnected to a commercial power system is known. In this system, generally, DC currents generated by a plurality of solar cell strings are collected in a collection box, then supplied to an inverter, and converted into an AC current. The AC current is outputted to the commercial power system. The amount of power generation, the integrated amount of power generation and the like at this time are displayed on a display unit connected to the inverter. The constructions of the inverter and the display unit are briefly classified into the following two types.

The first construction has a control circuit in the inverter main body. The control circuit comprises a microcomputer or the like. The control circuit of the inverter main body drives display means in the display unit in accordance with a signal from an operation switch on the display unit and output power from the inverter.

The second construction has control circuits respectively in the inverter main body and the display unit. The control circuit of the inverter main body sends data on the amount of power generation to the control circuit of the display unit based on output power from the inverter. The control circuit of the display unit drives display means in the display unit based on the received data and setting by an operation switch on the display unit, to display the amount of power generation, the integrated amount of power and the like. Note that the output power from the inverter is referred to as "the amount of power generation" of the photovoltaic power generation system. The integrated amount of power is a value obtained by integration of the amount of power generation.

In both constructions, one display unit is connected to one inverter.

Further, to display the amount of power generation, a specialized power measuring device may be provided independently of the photovoltaic power generation system. In this case, generally, the construction includes a transducer to detect electric power, an analog to digital (A/D) converter to digitize an analog output signal from the transducer, a control computer utilizing a personal computer (PC) or the like, display means using a cathode-ray tube (CRT) and the like.

In the display unit to display the amount of power generation of the photovoltaic power generation system by the above technique, one inverter is connected to only one display unit. Accordingly, in a case where a plurality of solar cells are provided so as to obtain 8 kW as a total output, and the halves of the solar cells as solar cell arrays are respectively connected to an inverter having rated power of 4 kW, the number of inverters is two. Even if the amount of power generation and integrated amount of power in each inverter can be displayed, the sum of power generation and integrated amount of power in the photovoltaic power generation system cannot be displayed.

On the other hand, if a high rated-power inverter is used, the sum of power generation and integrated amount of power in the entire photovoltaic power generation system can be displayed by one display unit. However, as it is necessary to prepare an inverter having a rated power corresponding to the rated output of the solar cells, i.e., the inverter is specifically designed, the cost is higher in comparison with a case using a plurality of lower rated-output inverters. Further, the external size of the inverter increases in proportion to increment in the output capacity, and wide space is required upon installation of the inverter. Further, in correspondence with increment in weight of inverter, the position of installation requires a certain load-bearing capacity, and further, installation operability is degraded. Accordingly, the construction using a plurality of existing low rated-output inverters is desirable.

Further, in a case where a specialized power measuring device is provided, very high-precision measurement is possible by using the specialized device, however, the cost is very high. Further, in this case, it is troublesome to design the transducer and software for the control computer in correspondence with the rated amount of power generation of the photovoltaic power generation system. Especially, if the additional solar cells and that of inverters are provided in the photovoltaic power generation system, much labor is required to change the transducer and the control software.

SUMMARY OF THE INVENTION

The present invention has as its object to solve the above problems, and has another object to provide an information display apparatus and an information relay apparatus for displaying the sum of power generation of a photovoltaic power generation system using a plurality of power control devices (interverters), which can be installed at a low cost, an information display method and an information relay method, and an information transmission method.

According to the present invention, the foregoing object is attained by providing an information-display apparatus used with a solar power-generation system having plural power-control units, each of which independently operates and converts direct-current power generated by a solar battery to alternating-current power to be provided to a load, said apparatus comprising: receiving means for receiving information from said plural power-control units, wherein the received information includes at least generated power data which represents output power from each of said plural power-control units; calculating means for calculating a sum of the output power from all of said plural power-control units; and displaying means for displaying the received information and/or the calculated sum.

Further, the foregoing object is attained by providing an information-relay apparatus for relaying information between a solar power-generation unit and plural information-display units, wherein said solar power-generation unit has plural inverters, each of which independently operates and converts direct-current power generated by a solar battery to alternating-current power to be provided to a load, said apparatus comprising: receiving means for receiving information from said plural inverters, wherein the received information includes at least generated power data which represents output power from each of said plural inverters; calculating means for calculating a sum of the output power from all of said plural inverters; and outputting means for outputting information, which includes at least data which represents the sum, to said plural information-display units.

Further, the foregoing object is attained by providing a transmission method of transmitting information indicating generated power which is outputted from each or all of plural inverters of a solar power-generation apparatus, wherein each of the plural inverters independently operates and converts direct-current power generated by a solar battery to alternating-current power to be provided to a load, said method comprising the steps of: setting or updating a full-scale value based on a value of the generated power; modulating a signal as indicating the information, which indicates the generated power, to be transmitted in accordance with the full-scale value; and transmitting the modulated signal.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 5 is a top plan view of the display unit;

FIGS. 16 and 17 are diagrams showing PWM-rule full-scale settings; and

DETAILED DESCRIPTION OF THE PREFERRED EMBODIMENTS

Figure 1:
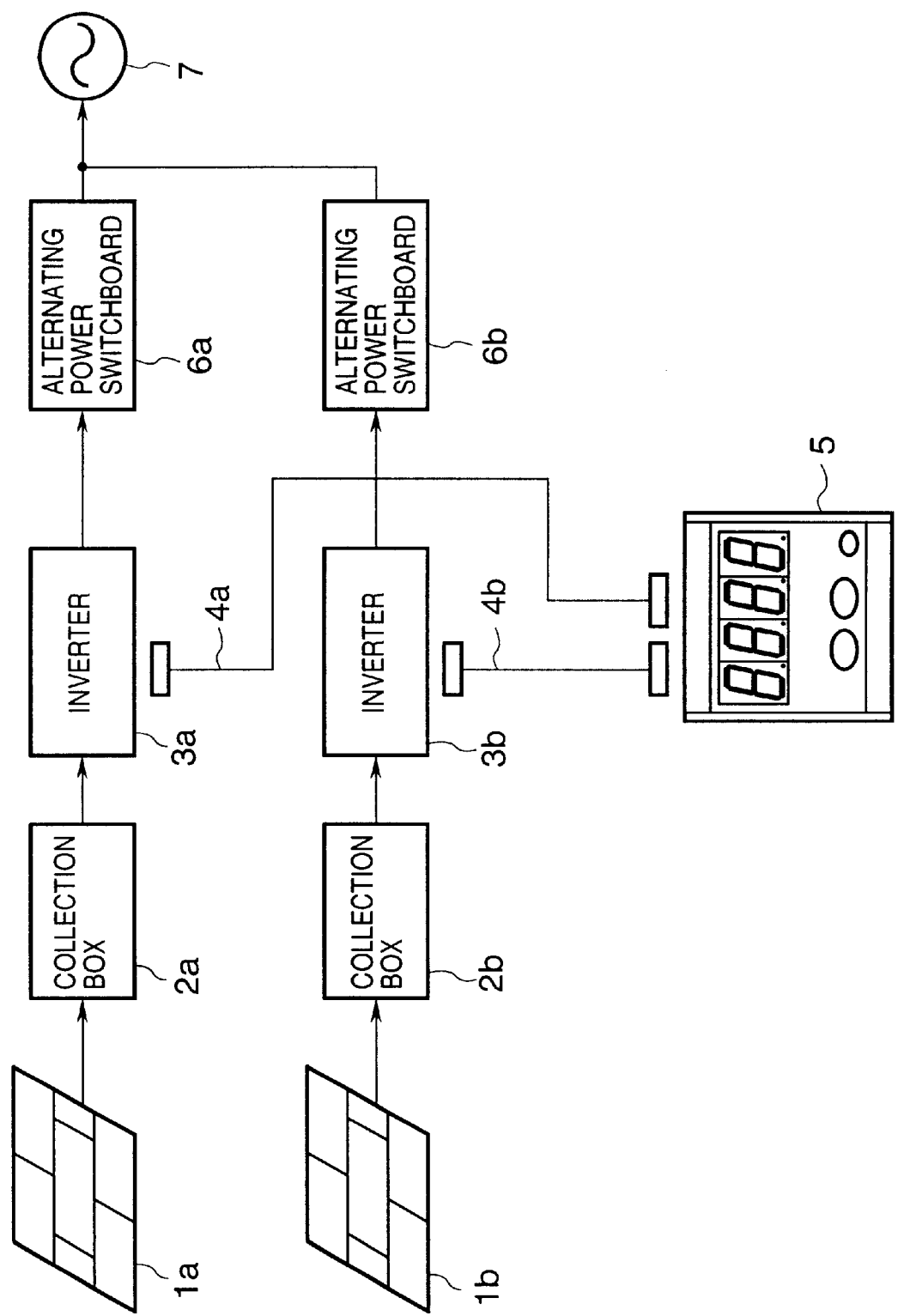
FIG. 1 is a block diagram showing the construction of a system-interconnection type photovoltaic power generation system according to a first embodiment of the present invention.

Preferred embodiments of the present invention will now be described in detail in accordance with the accompanying drawings.

A power information display apparatus (display unit) in the preferred embodiments of the present invention has a plurality of connectors, optical communication means or radio communication means, for respectively receiving information outputted from a plurality of power control devices (inverters). Preferably, the information received by the power information display apparatus includes the amounts of power generation and the integrated amounts of power in the respective power control devices, and the sum value of the amounts of power generation and the sum value of integrated amounts of power, further, status information indicative of statuses of the respective power control devices.

Further, it is preferable that in the photovoltaic power generation system of the present invention, the respective power control devices include a power source to supply electric power to the power information display apparatus, and preferably, the power information display apparatus receives the electric power from the respective power control devices in parallel.

Further, it is preferable that information relayed by the power information relay apparatus includes the sum value of the amounts of power generation and the sum value of integrated amounts of power in the respective power control devices. Further, it is preferable that the power information relay apparatus receives the status information indicative of the statuses of the respective power control devices outputted from the respective power control devices, and transmits the respective status information as information to discriminate the respective power control devices, to the power information display apparatus. Further, it is preferable that the power information relay apparatus has a plurality of input connectors to receive information respectively outputted from the plurality of power control devices and a plurality of output connectors to transmit the information to a plurality of power information display apparatus. Otherwise, it is preferable that the power information relay apparatus has optical communication means or radio communication means for receiving information outputted from the plurality of power control devices.

Further, it is preferable that in the photovoltaic power generation system of the present invention, the power information relay apparatus and the power information display apparatus respectively have connectors having the same shape to receive information from the power control devices. Further, it is preferable that the power control devices and the power information relay apparatus respectively have connectors having the same shape to transmit information. Further, the power control devices respectively include a power source to supply electric power to the power information relay apparatus and the power information display apparatus, and the power information relay apparatus receives the electric power from the respective power control devices in parallel, and supplies the received electric power to the power information display apparatus.

Next, the embodiments of the present invention will be described in detail with reference to the drawings.

First Embodiment

System Construction

FIG. 1 is a block diagram schematically showing the construction of a photovoltaic power generation system according to a first embodiment of the present invention. Reference numerals 1a and 1b denote solar cell arrays, respectively formed by connecting solar cell strings, each having serially-connected plural solar cell modules, in parallel. Various types of solar cells, various solar cell modules and their installation formats, and various interconnection formats among the solar cell modules are known, and the present invention has no limitation on the type of solar cell and solar cell modules, installation and interconnection among the solar cell modules.

Numerals 2a and 2b denote collection boxes having collection mechanisms to collect electric power outputted from the plurality of solar cell strings, switch units for connection/disconnection between the solar cell array 1a and an inverter 3a and the solar cell array 1b and an inverter 3b, mechanisms to check and perform maintenance on outputs from the solar cell arrays 1a and 1b, and reverse current blocking mechanisms to block reverse currents by diodes.

Numerals 3a and 3b denote inverters which convert direct-current (DC) power supplied from the collection boxes 2a and 2b into alternating-current (AC) power and output the electric power to a commercial AC power system 7. Numerals 4a and 4b denote cables which transmit signals indicative of the amounts of power generation in the inverters 3a and 3b to a display unit 5. The cables 4a and 4b are connected to the inverters 3a and 3b at one end, and connected to connectors of the display unit 5 at the other end.

The display unit 5 displays information on electric power. As shown in FIG. 1, the display unit 5 has two connectors for connection with the connection cables 4a and 4b. Numerals 6a and 6b denote alternating power switchboards which interconnect the AC power supplied from the inverters 3a and 3b to the commercial AC power system 7.

Figure 2:
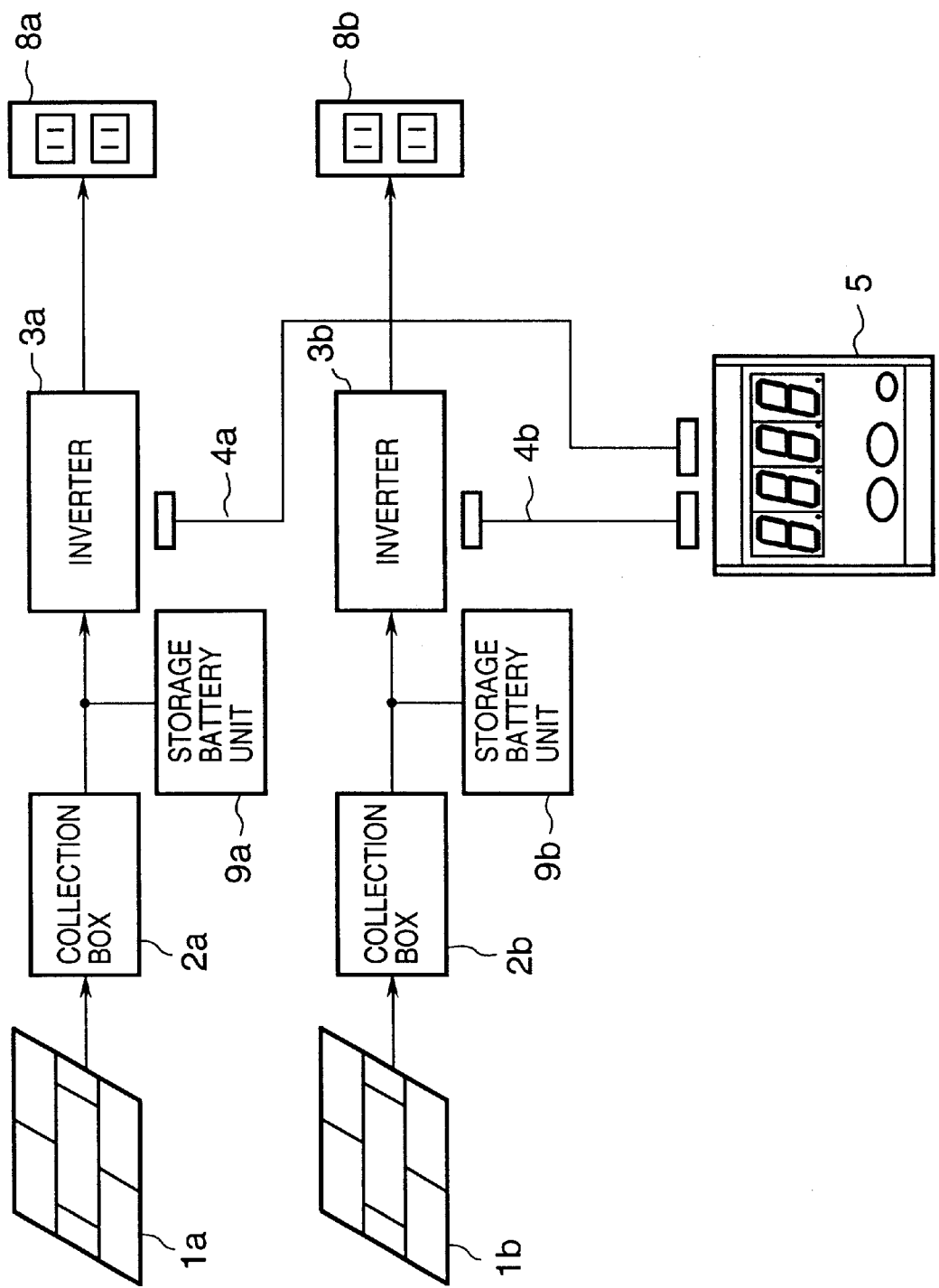
FIG. 2 is a block diagram showing the construction of a self-sustaining type photovoltaic power generation system according to the first embodiment.

In the construction in FIG. 1, the inverters 3a and 3b are interconnected to the commercial AC power system 7, however, it may be arranged such that self-sustained outputs from the inverters 3a and 3b are supplied to receptacles 8a and 8b to supply electric power to alternating loads as shown in FIG. 2. Further, numerals 9a and 9b denote capacitors which store electric power during the daytime or the like where the amounts of power generation in the solar cell arrays 1a and 1b are large, and supply the electric power to the inverters 3a and 3b in the morning/night time where the amounts of power generation are small.

<Inverter Construction>

Figure 3:
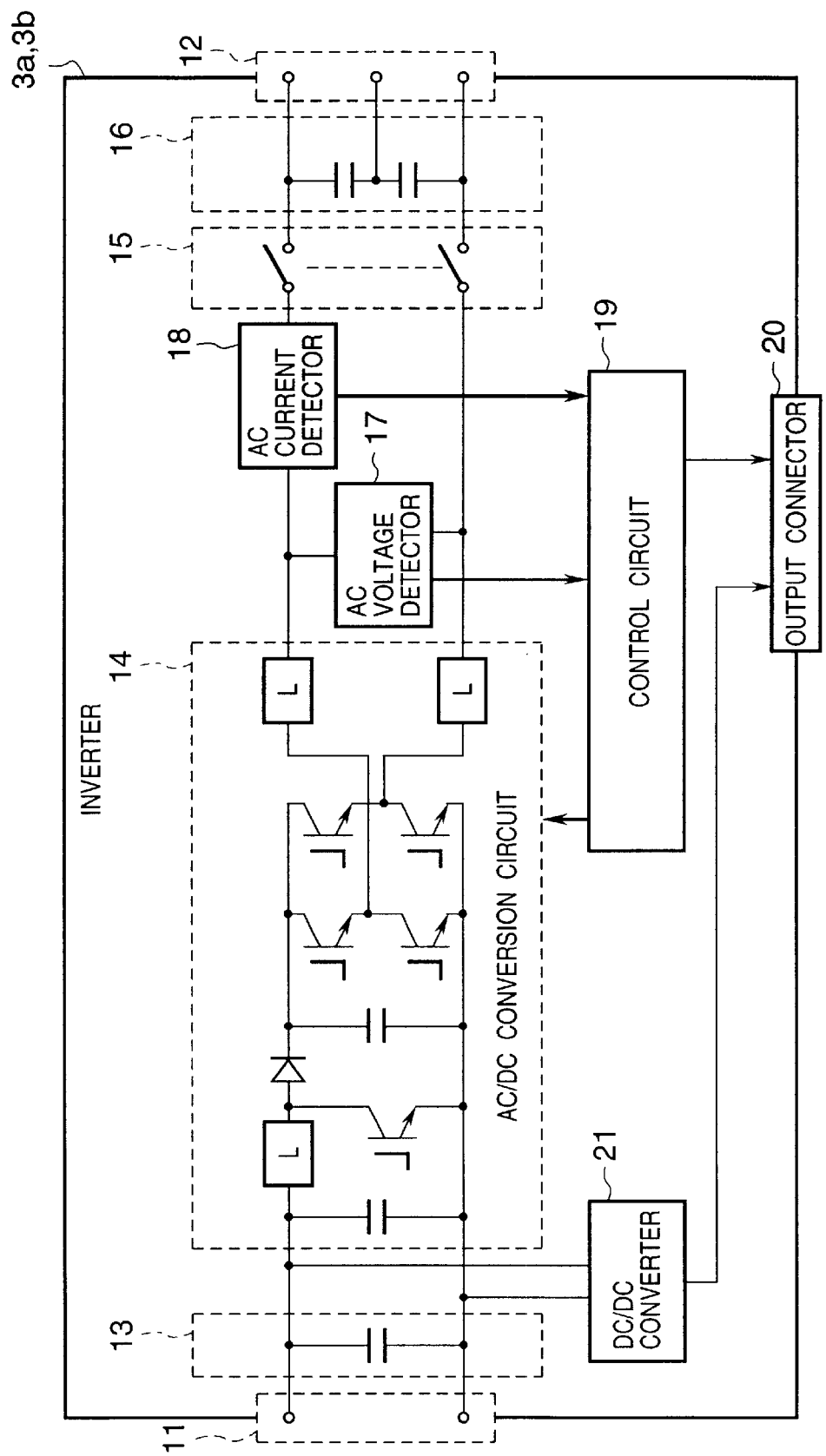
FIG. 3 is a block diagram showing the construction of an inverter in FIGS. 1 and 2.

FIG. 3 is a block diagram showing the construction of the inverters 3a and 3b. Numeral 11 denotes an input terminal which inputs DC power sent from the solar cells 1a or 1b via the collection box 2a or 2b; 12, an output terminal which outputs the AC power to the commercial AC power system 7 or the alternating loads; 13, an input-side noise filter comprising a capacitor or the like; 14, an AC/DC conversion circuit, comprising a smoothing capacitor, reactors L, diodes, switching devices and the like, which has a chopper (DC/DC converter) and a DC/AC inverter; 15, an output switch for switching to output AC power or not; 16, an output-side noise filter; 17, an AC voltage detector; and 18, an AC current detector.

Numeral 19 denotes a control circuit, comprising a microprocessor or the like, for the inverter. The control circuit 19 performs various control and protection on the DC/AC inverter and the chopper. Further, the control circuit 19 calculates output electric power from the inverter based on detection values from the AC voltage detector 17 and the AC current detector 18, and supplies the result of calculation as data on the amount of power generation to an output connector 20 so as to supply the data to the display unit 5.

Numeral 21 denotes a DC/DC converter which inputs the DC power sent via the collection box 2a or 2b and converts the electric power to DC power to drive the display unit 5. This electric power is also supplied to the display unit 5 via the output connector 20. That is, the inverters 3a and 3b also serve as power sources to drive the display unit 5.

[Display Unit Construction]

Figure 4:
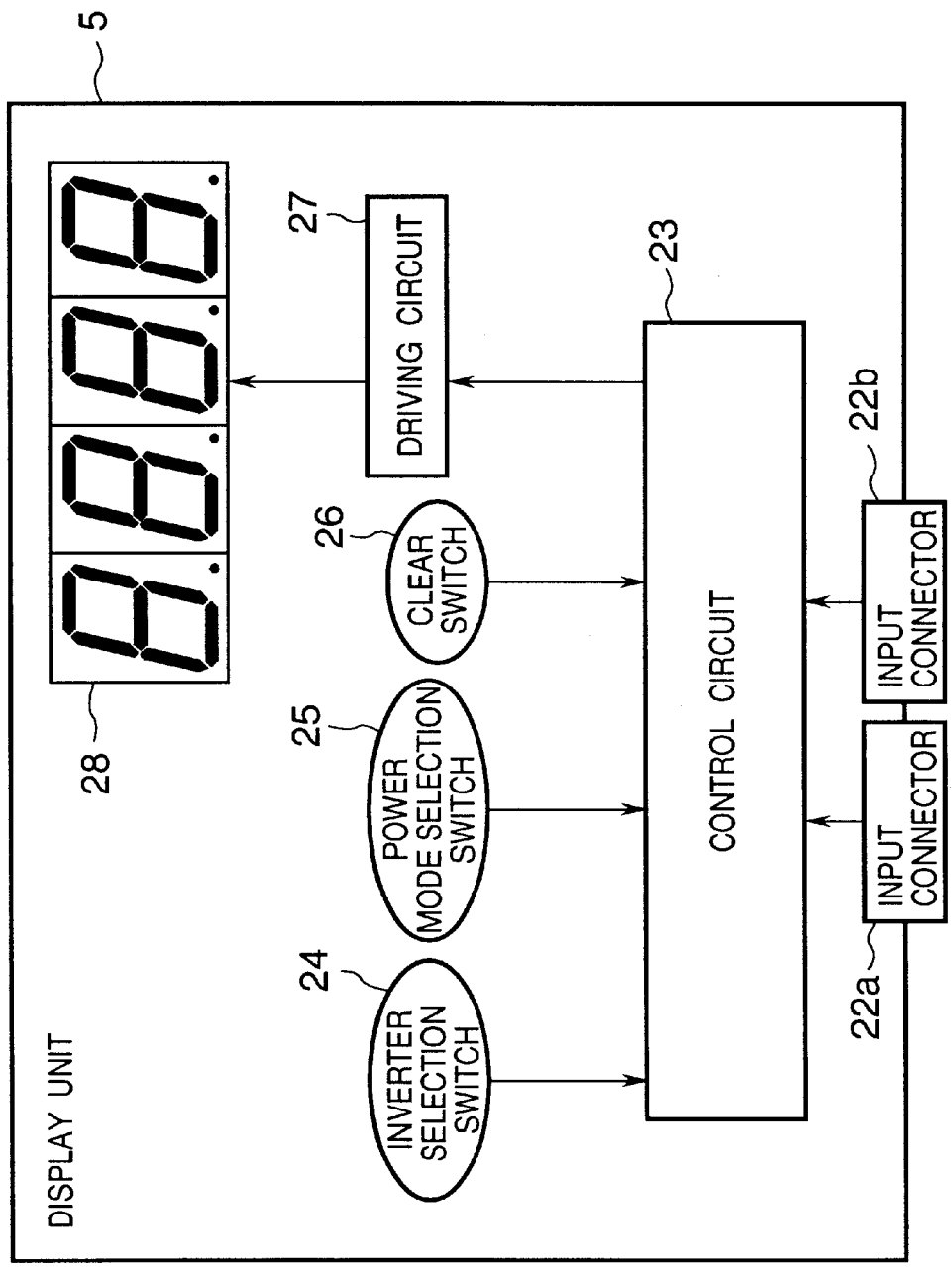
FIG. 4 is a block diagram showing the construction of a display unit in FIGS. 1 and 2.

FIG. 4 is a block diagram showing the construction of the display unit 5. Numerals 22a and 22b denote two connectors which input the data on the amounts of power generation and the DC power from the inverters 3a and 3b. The connectors 22a and 22b, connected to the inverters 3a and 3b via the cables 4a and 4b, receive the data on the amounts of power generation, and also receive the DC power from the DC/DC converters of the inverters 3a and 3b in parallel.

Numeral 23 denotes a control circuit comprising a microprocessing or the like, provided in the display unit 5. Numerals 24 to 26 denote switches such as push switches to operate display content. Specifically, numeral 24 denotes an inverter selection switch; 25, a power mode selection switch; and 26, a clear switch to clear the integrated amount of power. Numeral 28 denotes a display LED as an example of a display panel to display the amount of power generation and the like; and 27, a driving circuit to drive the display LED 28.

[Operation of Display Unit]

FIG. 5 is a top plan view of the display unit 5. Generally, the display unit 5, placed in a position which can be easily seen by a user of the photovoltaic power generation system, displays the current amount of power generation, the integrated amount of power and the sum of integrated amounts of power. That is, the amount of power generation, the integrated amount of power or the sum of integrated amounts of power can be displayed on the display LED 28 by operating the power mode selection switch 25. When the display of the amount of power generation is selected, the electric power currently outputted from the inverter 3a and/or 3b, i.e., the amount of power generation (unit: kW) is displayed. When the display of the sum of integrated amounts of power is selected, the amount of power (unit: kWh) outputted from the inverter 3a and/or 3b since the start of the operation of the inverter is displayed. When the display of integrated amount of power is selected, the amount of electric power (unit: kWh) outputted from the inverter 3a and/or 3b from a point where the clear switch 26 was depressed is displayed.

The amount of power generation or the sum of integrated amounts of power can be selected from any of the value of the inverter 3a, the value of the inverter 3b, and the sum of the values of both inverters, by operating the inverter selection switch 24 provided on the display unit 5. When the inverter 3a is selected by operating the inverter selection switch 24, the value of the inverter 3a connected to the connector 22a is displayed; when the inverter 3b is selected, the value of the inverter 3b connected to the connector 22b is displayed; and when the sum value is selected, the sum of the values of the inverters 3a and 3b is displayed.

Although not shown in FIG. 5, independently of the display LED 28 to display the amount of power generation and the like, a display panel or indicator may be provided to indicate the inverter relating to a value currently displayed on the display LED 28, or indicate that the displayed value is the sum value. Similarly, a display panel or indicator may be provided to indicate that a value currently displayed on the display LED 28 is the amount of power generation/the integrated amount of power/sum of integrated amounts of power.

Figure 6:
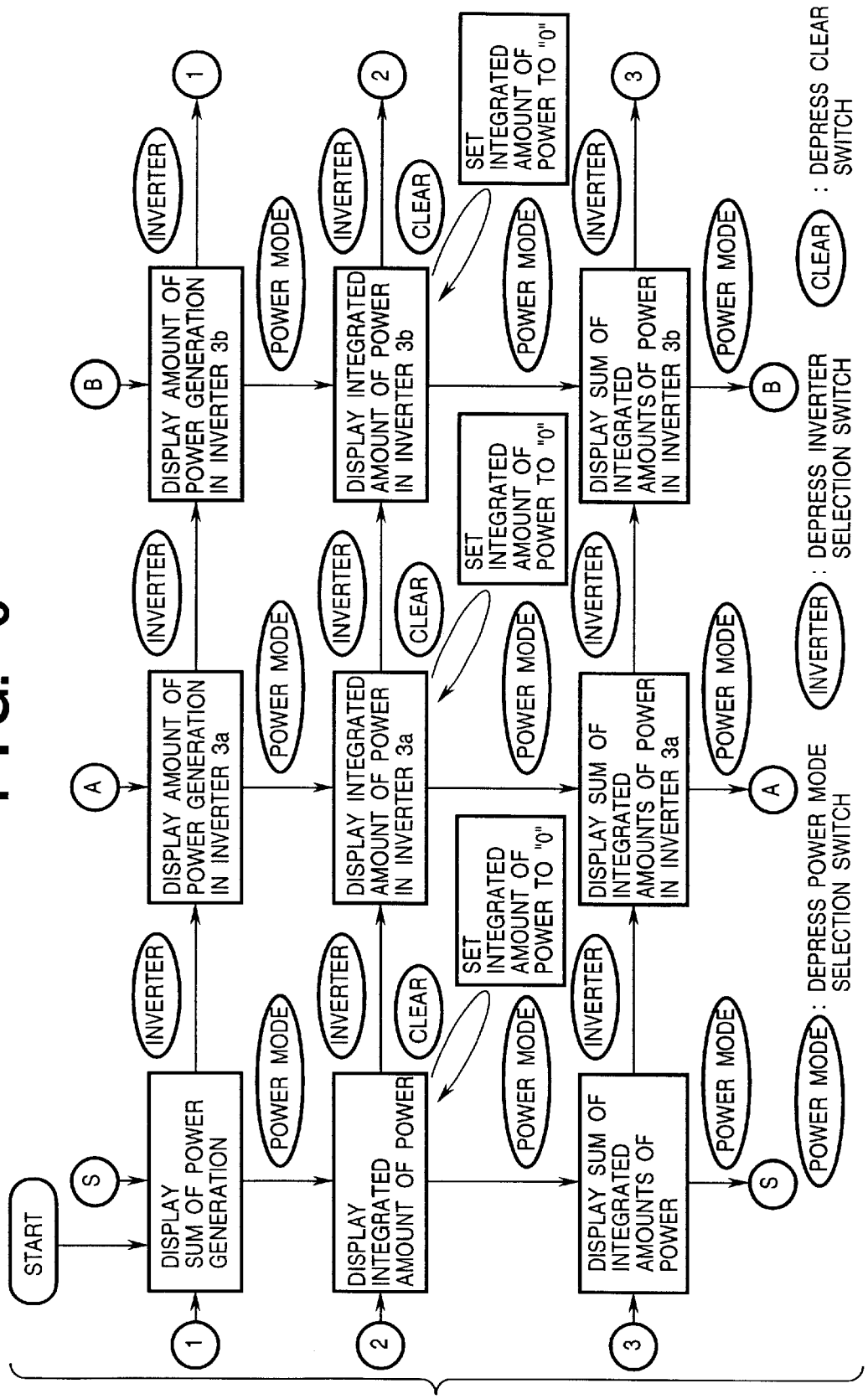
FIG. 6 is a diagram showing display status transition in the operation of the display unit.

FIG. 6 is a diagram showing display status transition in the operation of the display unit 5. The type of displayed value changes upon every operation on the power mode selection switch 25. That is, every time the power mode selection switch 25 is operated, the displayed value sequentially becomes the amount of power generation, the integrated amount of power, the sum of integrated amounts of power, and the amount of power generation again. Every time the inverter selection switch 24 is operated, the displayed value sequentially becomes the value of inverter 3a/3b or the sum value. That is, the value displayed every time the inverter selection switch 24 is operated sequentially becomes the sum value, the value of the inverter 3a, the value of the inverter 3b, and the sum value again.

Further, in a status where the amount of power generation or the sum of integrated amounts of power is displayed, the display is not influenced even if the clear switch 26 is operated, however, in a status where the integrated amount of power is displayed, if the clear switch 26 is operated, the integrated amount of power is cleared to zero. In this case, only the displayed integrated amount of power of the inverter is cleared.

In the above construction, data transmission from the inverters 3a and 3b to the display unit 5 is made by serial transmission in unidirectional communication. Note that bidirectional communication may be performed. In case of bidirectional communication, the reliability of communication can be improved, and the data necessary for the display unit 5 can be obtained and displayed at desired timing by transmitting a signal requiring data from the display unit 5 to the inverter 3a and/or 3b. Further, the serial transmission may be replaced by parallel transmission, and a pulsewidth-modulated pulse signal (PWM) may be transmitted so as to indicate the amount of power generation. In the former case, comparatively high-speed data transmission is possible. In the latter case, the circuit construction can be simplified.

The control circuit 23 of the display unit 5 obtains the current amounts of power generation in the inverters 3a and 3b from the data on the amounts of power generation received from the inverters 3a and 3b. Then the control circuit 23 obtains the sum of power generation by adding the amounts of power generation in the inverters 3a and 3b. Further, the control circuit 23 integrates the amounts of power generation in the inverters 3a and 3b and the sum of power generation, to obtain the integrated amounts of power generation in the inverters 3a and 3b and the sum of integrated amounts of power, and sequentially updates the sum of integrated amounts of power stored in a nonvolatile memory provided in the control circuit 23. Similarly, the control circuit 23 integrates the amounts of power generation since the clear switch 26 was operated, to obtain the integrated amounts of power in the inverters 3a and 3b and the sum of integrated amounts of power, and sequentially updates the integrated amount of power stored in the nonvolatile memory. Thus, the amounts of power generation and integrated amounts of power in the inverters 3a and 3b which separately operate, and the sum of power generation and the sum of integrated amounts of power can be displayed in real time.

As described above, in accordance with operation on the inverter selection switch 24, the power mode selection switch 25 and the clear switch 26, the control circuit 23 of the display unit 5 selects an inverter to display the amount of power generation or the like, and select the amount of power generation, the integrated amount of power or the sum of integrated amounts of power, and drives the driving circuit 27 so as to display the designated information on the display LED 28.

According to the construction of the first embodiment, in the photovoltaic power generation system using the plurality of inverters, the sum of power generation, the integrated amounts of power in the plurality of inverters and the sum of integrated amounts of power can be displayed without adding special functions to the inverters on the display unit 5. Further, as the display unit 5 can be realized with slight increase in cost in comparison with that for a general display unit, without using a specialized measuring device, the above function can be provided at a low cost.

Further, as DC power can be supplied from the plurality of inverters to the display unit 5 in parallel, even if one or more inverters stop or only the DC/DC 21 stops in one or more inverters, values of the amounts of power generation and the integrated amounts of power in all the inverters including the inverters which stop can be displayed while the DC power is supplied from at least one inverter to the display unit 5.

Further, in the first embodiment, DC power is supplied to the display unit 5 via the connection cables 4a and 4b, however, another power-source input terminal may be provided in the display unit 5 to receive the DC power from outside, or a battery may be provided in the display unit 5 to supply the electric power. When the DC power is supplied from the outside or the battery, the display unit 5 is operative during the night time when the inverters stop, which is convenient to check the integrated amount of power or the like even in the night time.

Further, in the first embodiment, the display unit selectively displays the amounts of power generation in the inverters 3a and 3b or the sum of power generation, the integrated amounts of power in the inverters 3a and 3b or the sum of integrated amounts of power, however, it may be arranged such that a plurality of display LEDs 28 are provided and used for simultaneously displaying those values.

Further, as the functions of the display unit 5, a function to display operation statuses, setting statuses, fault statuses, error contents and the like in the inverters 3a and 3b, can be added to the function to display the amount of power generation, the integrated amount of power and the sum of integrated amounts of power.

Further, in the first embodiment, the two connectors are provided for connection with the two inverters 3a and 3b, however, the number of connectable inverters is not limited to two, but three or more inverters can be connected by providing three or more connectors. Further, in case of bidirectional communication, as a plurality of inverters and display units 5 can be bus-connected, even if the display unit 5 has only one connector, the display unit 5 can be connected to the plurality of inverters.

Further, the inverters 3a and 3b merely transmit data on the amount of power generation, and the display unit 5 cannot discriminate the inverters only from the received data. If it is necessary to recognize the inverter that issued the data on the display unit 5 side, it can be easily arranged such that address information (ID) is included in the data outputted from the inverters 3a and 3b. In this case, the display unit 5 can manage received data based on the address information.

Second Embodiment

Next, the photovoltaic power generation system according to a second embodiment of the present invention will be described. Note that in the second embodiment, constituents corresponding to those in the first embodiment have the same reference numerals and the explanations of the constituents will be omitted.

[System Construction]

Figure 7:
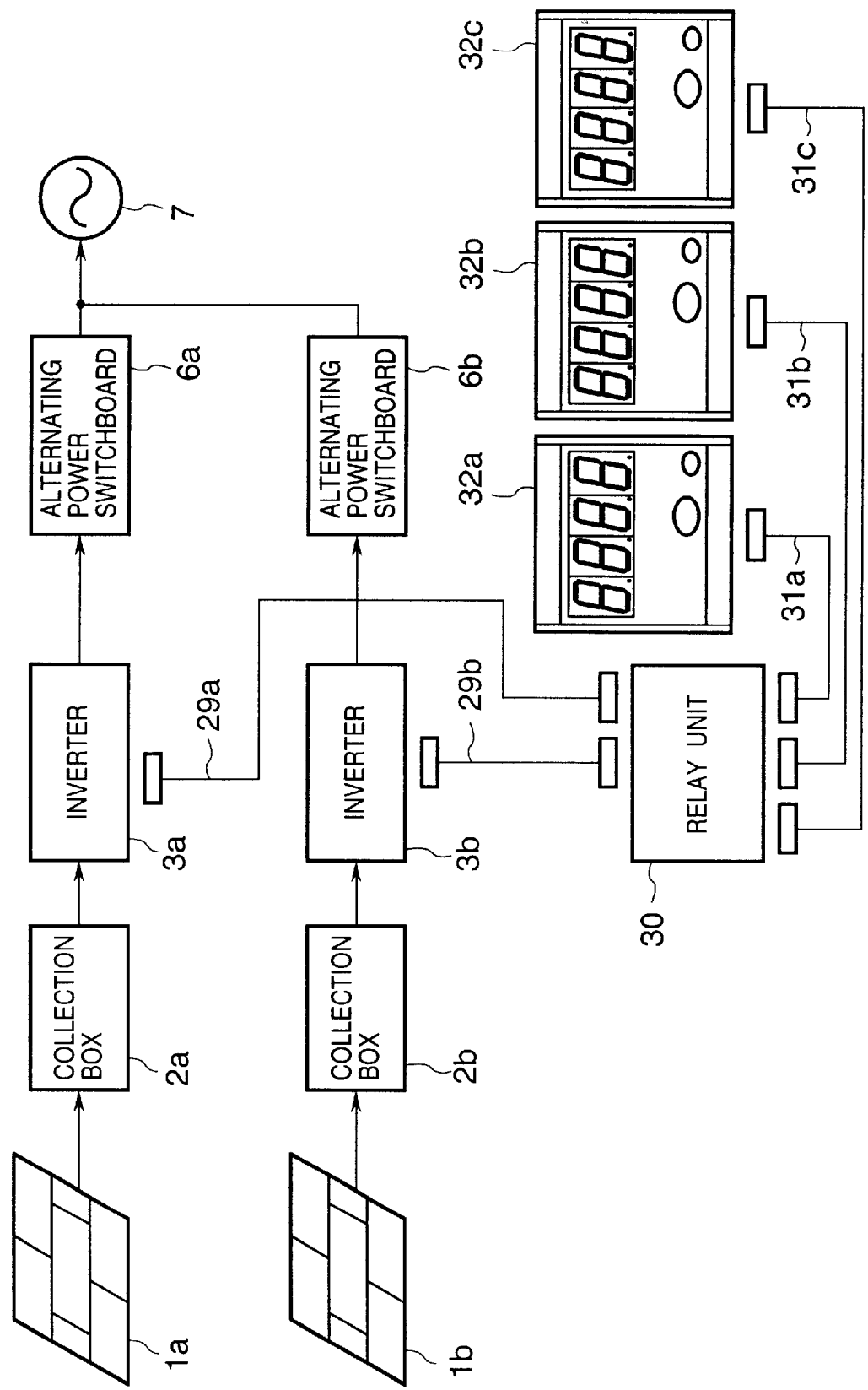
FIG. 7 is a block diagram showing the construction of the system-interconnection type photovoltaic power generation system according to a second embodiment of the present invention.

FIG. 7 is a block diagram schematically showing the construction of the system-interconnection type photovoltaic power generation system according to the second embodiment of the present invention. Numerals 29a and 29b denote cables to transmit data on the amounts of power generation in the inverters 3a and 3b to a relay unit 30. The cables 29a and 29b are connected to the connectors of the inverters 3a and 3b at one end, and connected to connectors of the relay unit 30 at the other end. The relay unit 30 receives the data on the amounts of power generation from the respective inverters 3a and 3b, and outputs various data on the amounts of power generation based on the received data.

The relay unit 30 in the second embodiment has two connectors for connection with the inverter side, and three connectors for connection with the display unit side. The relay unit 30 is connected to display units 32a to 32c respectively via cables 31a to 31c.

As in the case of the first embodiment, in the construction in FIG. 7, the inverters 3a and 3b are interconnected to the commercial AC power system 7, however, it may be arranged such that the alternating outputs from the inverters 3a and 3b are directly supplied to the alternating loads as shown in FIG. 2. Further, the connection cables 31a to 31c are connected to the display units 32a to 32c via the connectors, however, the cables 31a to 31c and the display units 32a to 32c may be integrated without connectors.

Further, the display units 32a to 32c perform display related to the power generation in the inverter 3a, display related to the power generation in the inverter 3b, and display related to the sum of power generation in the inverters 3a and 3b, respectively. Accordingly, it is preferable that the display units 32a to 32c are placed in positions which can be easily seen from the user or manager of the photovoltaic power generation system.

[Relay Unit Construction]

Figure 8:
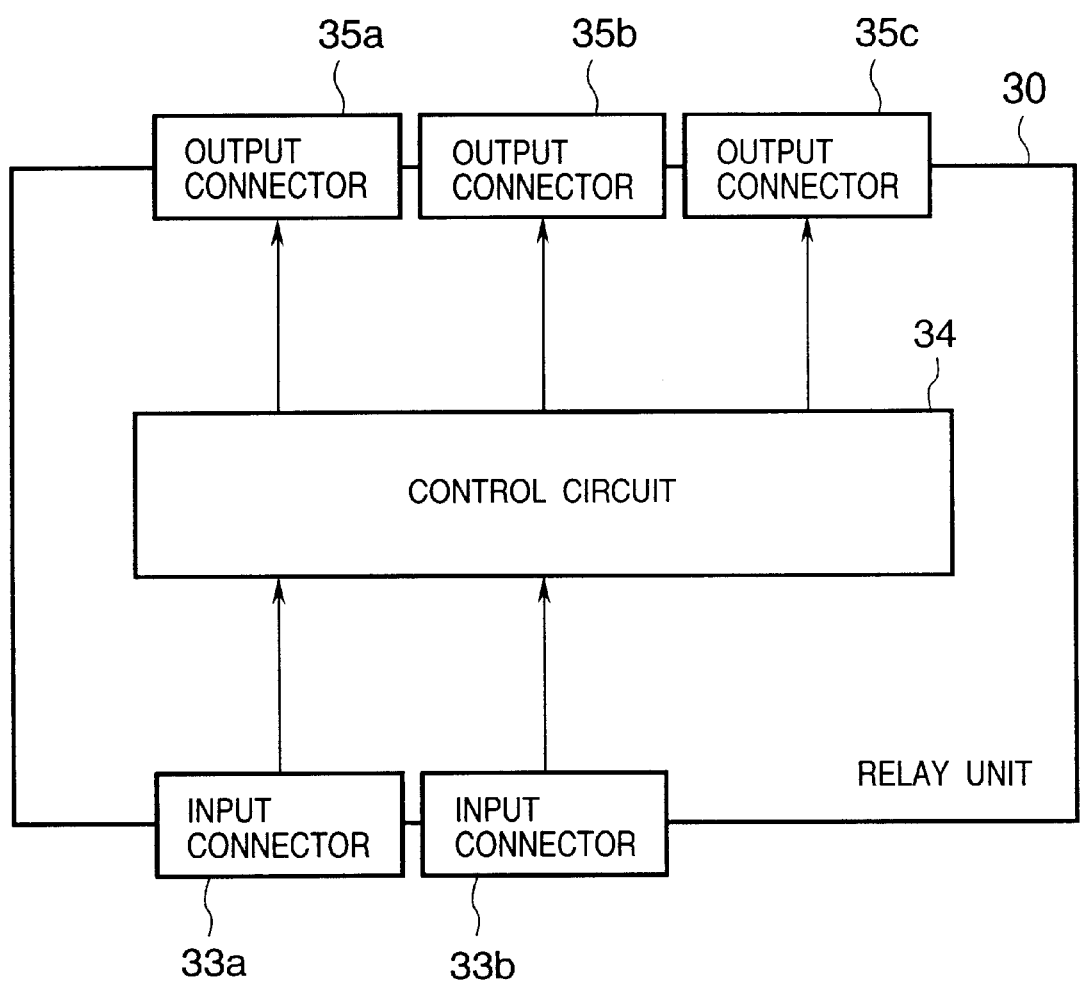
FIG. 8 is a block diagram showing the construction of the relay unit in FIG. 7.

FIG. 8 is a block diagram schematically showing the construction of the relay unit 30. Numerals 33a and 33b denote two input connectors to input data on the amounts of power generation and DC power from the inverters 3a and 3b. As the input connectors are connected to the inverters 3a and 3b via the cables 29a and 29b, the data on the amounts of power generation are received, and the DC power can be supplied in parallel from the DC/DC converters 21 of the inverters 3a and 3b.

Numeral 34 denotes a control circuit comprising a microprocessor or the like, which is provided in the relay unit 30. The control circuit 34 outputs data to be outputted to the display units 32a to 32c to output connectors 35a to 35c, based on the received data on the amounts of power generation. Further, the DC power is supplied to the display units 32a to 32c via the output connectors 35a to 35c.

[Display Unit Construction]

Figure 9:
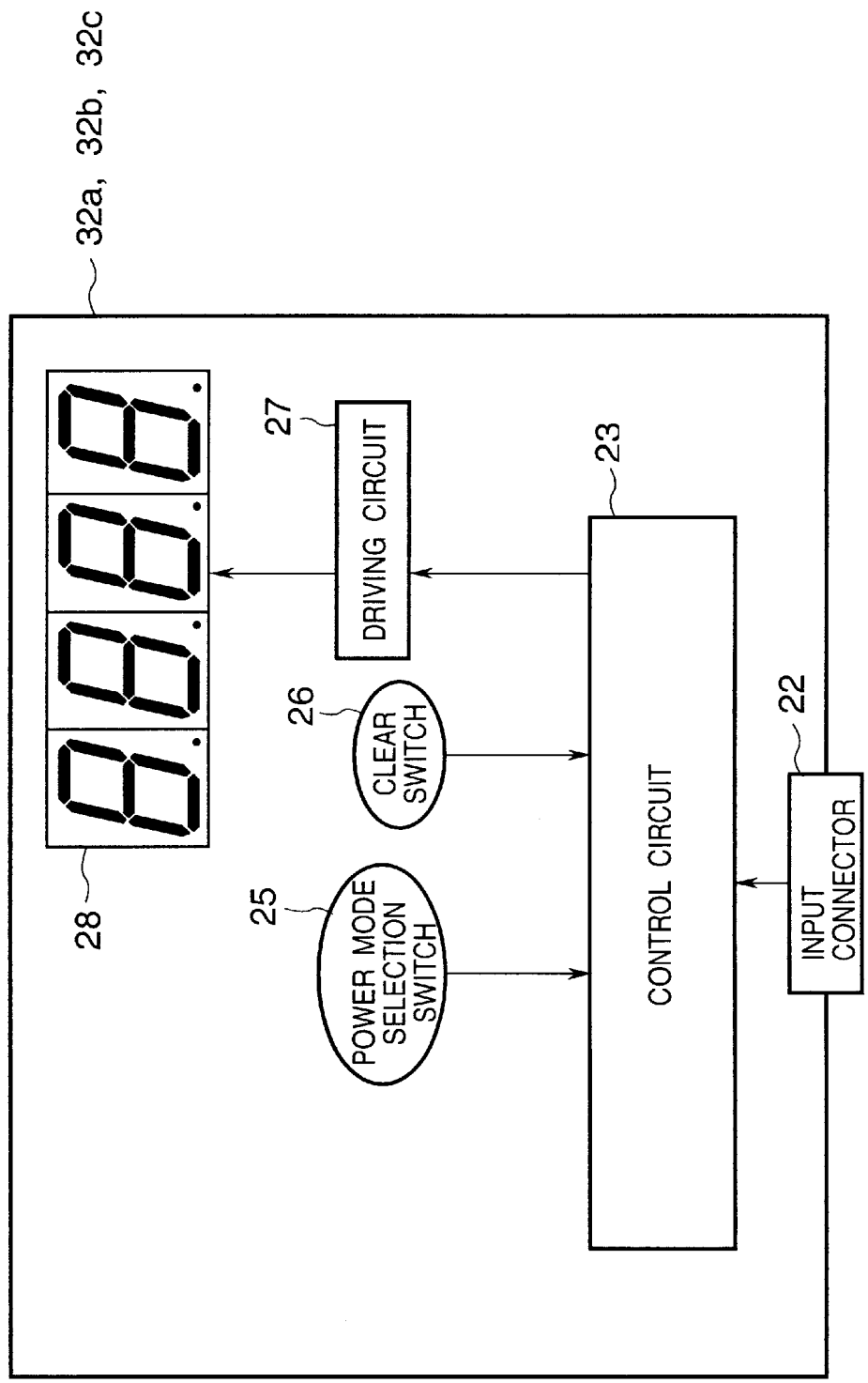
FIG. 9 is a block diagram showing the construction of the display unit in FIG. 7.

The three display units 32a to 32c have approximately the same construction of that of the display unit 5 in the first embodiment. Note that as shown in FIG. 9, the display units 32a to 32c differ from the display unit 5 in that they have one input connector 22 and they do not have the inverter selection switch 24. In other words, the display units 32a to 32c are initially provided to be connected to a single inverter.

[Operation of Relay Unit]

The control circuit 34 of the relay unit 30 receives data indicative of current amounts of power generation in the inverters 3a and 3b, from the inverters 3a and 3b. The control circuit 34 obtains the sum of power generation by adding the amounts of power generation in the inverters 3a and 3b. The control circuit 34 outputs data on the amount of power generation in the inverter 3a to the connector 35a; data on the amount of power generation in the inverter 3b, to the connector 35b; and data on the sum of power generation in the inverters 3a and 3b, to the connector 35c.

[Operation of Display Unit]

Figure 10:
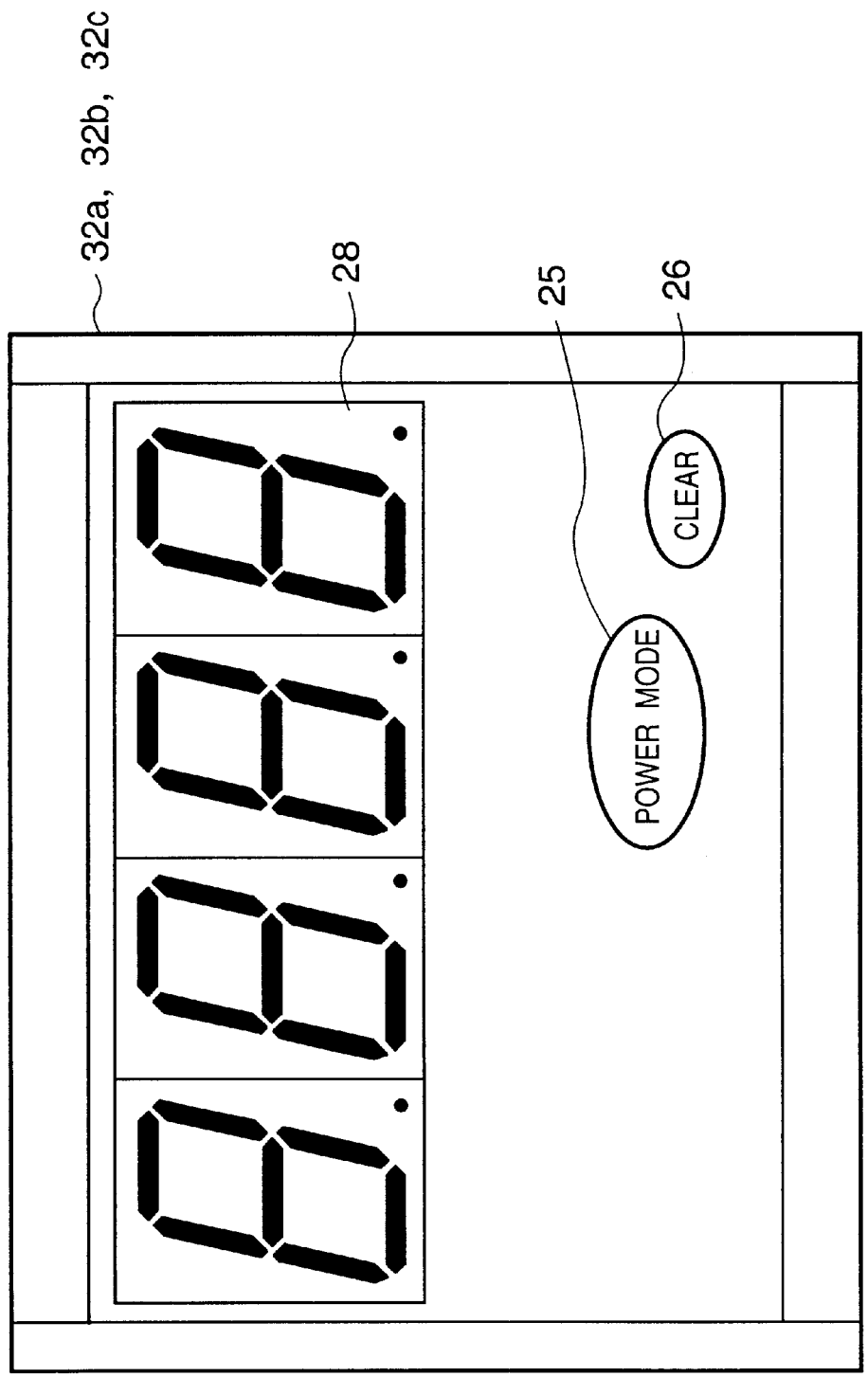
FIG. 10 is a top plan view of the display unit.

FIG. 10 is a top plan view of the display units 32a to 32c, which differs from that of the display unit 5 in FIG. 5 in that the inverter selection switch 24 is not provided.

Figure 11:
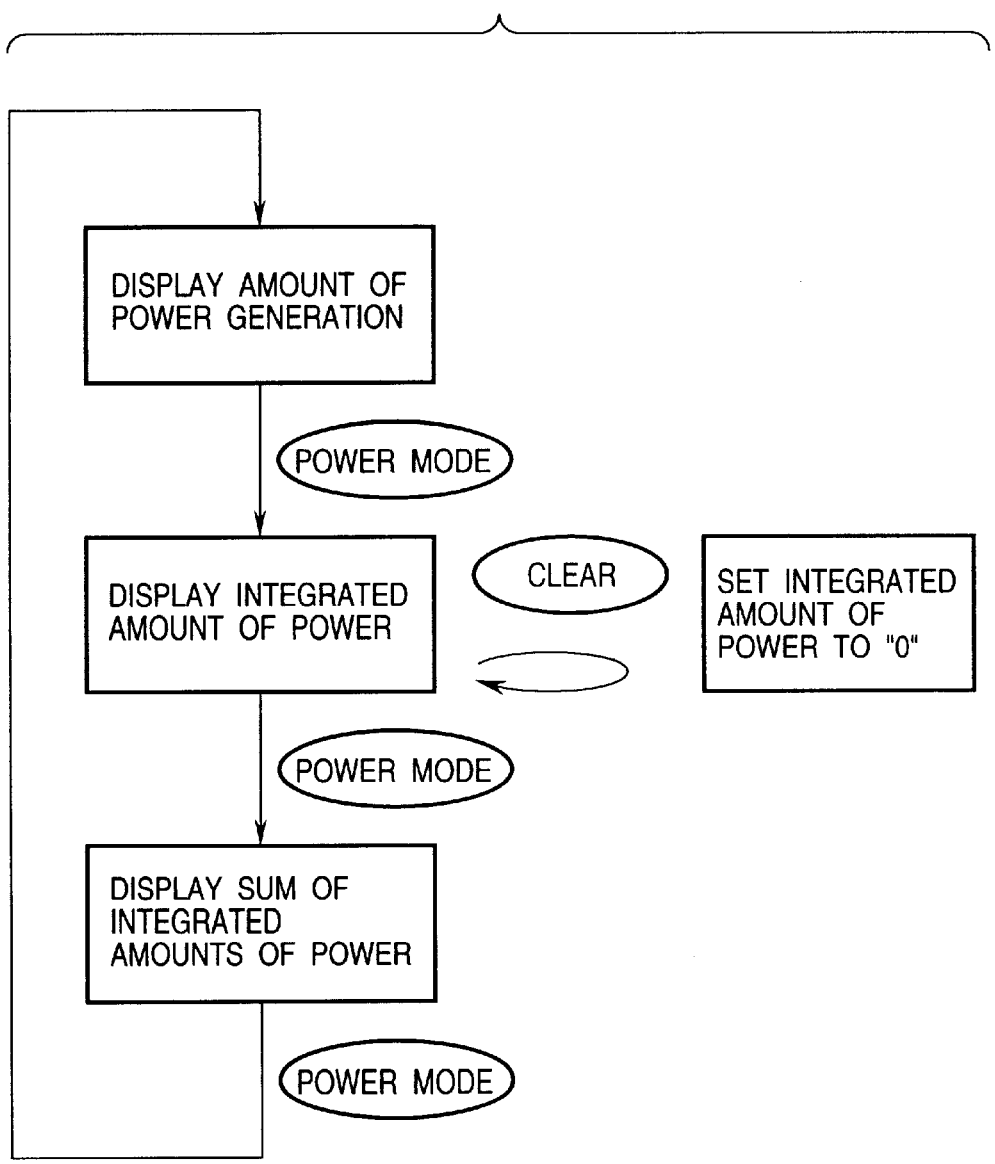
FIG. 11 is a diagram showing display status transition in the operation of the display unit.

FIG. 11 is a diagram showing display status transition in the operation of the display units 32a to 32c. The type of displayed value changes every time the power mode selection switch 25 is operated. That is, the value sequentially becomes the amount of power generation, the integrated amount of power, the sum of integrated amounts of power, and the amount of power generation again.

Further, when the amount of power generation or the sum of integrated amounts of power is displayed, the display is not influenced even if the clear switch 26 is operated, but if the clear switch 26 is operated when the integrated amount of power is displayed, the integrated amount of power is cleared to zero.

As described above, the display related to power generation in the inverter 3a, the display related to power generation in the inverter 3b, and the display related to the sum of power generation in the inverters 3a and 3b, are made on the display units 32a to 32c, respectively. Accordingly, the control circuit 23 of the display unit 32a obtains the current amount of power generation in the inverter 3a from the data on the amount of power generation received from the relay unit 30. Similarly, the control circuit 23 of the display unit 32b obtains the current amount of power generation in the inverter 3b from the received data on the amount of power generation. Similarly, the control circuit 23 of the display unit 32c obtains the current sum of power generation in the inverters 3a and 3b from the received data on the amount of power generation.

The control circuit 23 obtains the sum of integrated amounts of power by integrating the obtained amounts of power generation, and sequentially updates the sum of integrated amounts of power stored in its internal nonvolatile memory. Similarly, the control circuit 23 obtains the integrated amount of power by integrating the amounts of power generation since the clear switch 26 was operated, and sequentially updates the integrated amount of power stored in the nonvolatile memory. Thus, the independent amounts of power generation, the integrated amounts of power, the sum of integrated amount of power, and the sum of integrated amounts of power in the inverters that independently operate can be simultaneously displayed.

According to the second embodiment, as the relay unit 30 and the display units 32a to 32c are employed, in the photovoltaic power generation system using two inverters, the sum of power generation, the integrated amount of power and the sum of integrated amounts of power in the two inverters can be displayed without providing any special function in the inverters.

Further, as additional relay unit 30 having a simple construction is provided by utilizing the display units connectable to one inverter, the function to display the sum of power generation, the integrated amount of power and the sum of integrated amounts of power in the two inverters can be realized at a low cost.

Further, as the DC power is supplied from the two inverters 3a and 3b to the display units 32a to 32c in parallel, even in a case where one of the inverters 3a and 3b or only the DC/DC converter 21 of the inverter stops, while the DC power is supplied from the other inverter 3a or 3b to the display units 32a to 32c, the values of the amount of power generation and integrated amount of power in the inverter can be checked.

Further, the display units 32a to 32c can simultaneously display the respective amounts of power generation, the sum of power generation, the integrated amount of power and the sum of integrated amounts of power in the inverters 3a and 3b, in real time.

Further, if the output connector of the inverter, the output connector of the relay unit 30 have the same shape and/or the input connector of the relay unit 30 and the input connector of the display unit have the same shape, the display unit to be directly connected to the inverter, can be easily connected to the relay unit 30. This arrangement can construct an economical display system in which only one inverter realizes the photovoltaic power generation system at first, and when the number of the inverters is increased to two or more, the initial display unit can be used.

Further, in the second embodiment, the DC power is supplied through the connection cables to the relay unit 30 and the respective display units, however, another power-source input terminal may be provided in the relay unit 30 or the display units so as to receive DC power from outside, or a battery may be provided in the relay unit 30 and/or the display units to supply electric power. Note that it is more preferable that the construction is simplified by receiving the DC power from the relay unit 30 to the display units via the connection cables. When the DC power is supplied from the outside or batteries, the display unit is operative even in the night time where the inverters stop, which is convenient when it is necessary to check the integrated amount of power or the like even in the night time.

Further, in the second embodiment, the respective display units selectively display the amounts of power generation, the integrated amounts of power generation and the sum of integrated amounts of power generation, however, it may be arranged such that a plurality of display LEDs 28 are provided to simultaneously display those values.

Further, as the functions of the respective display units, a function to display operation statuses, setting statuses, fault statuses, error contents and the like in the inverters, can be added to the function to display the amount of power generation, the integrated amount of power and the sum of integrated amounts of power.

Further, in the second embodiment, the two connectors are provided in the relay unit 30 for connection with the two inverters 3a and 3b, however, the number of connectable inverters is not limited to two, but three or more inverters can be connected by providing three or more connectors. Further, in case of bidirectional communication, as a plurality of inverters and display units can be bus-connected, the number of connectors in the relay unit 30 may be one.

Further, in the above description, the data on the sum of power generation is outputted from only the output connector 35c of the relay unit 30, however, the number of output connectors in the relay unit 30 may be increased to transmit the data on the sum of power generation from the plural output connectors. In this case, the sum of power generation can be checked in, e.g., two positions away from each other on the first and second floors in a building where the photovoltaic power generation system is installed.

Figure 12:
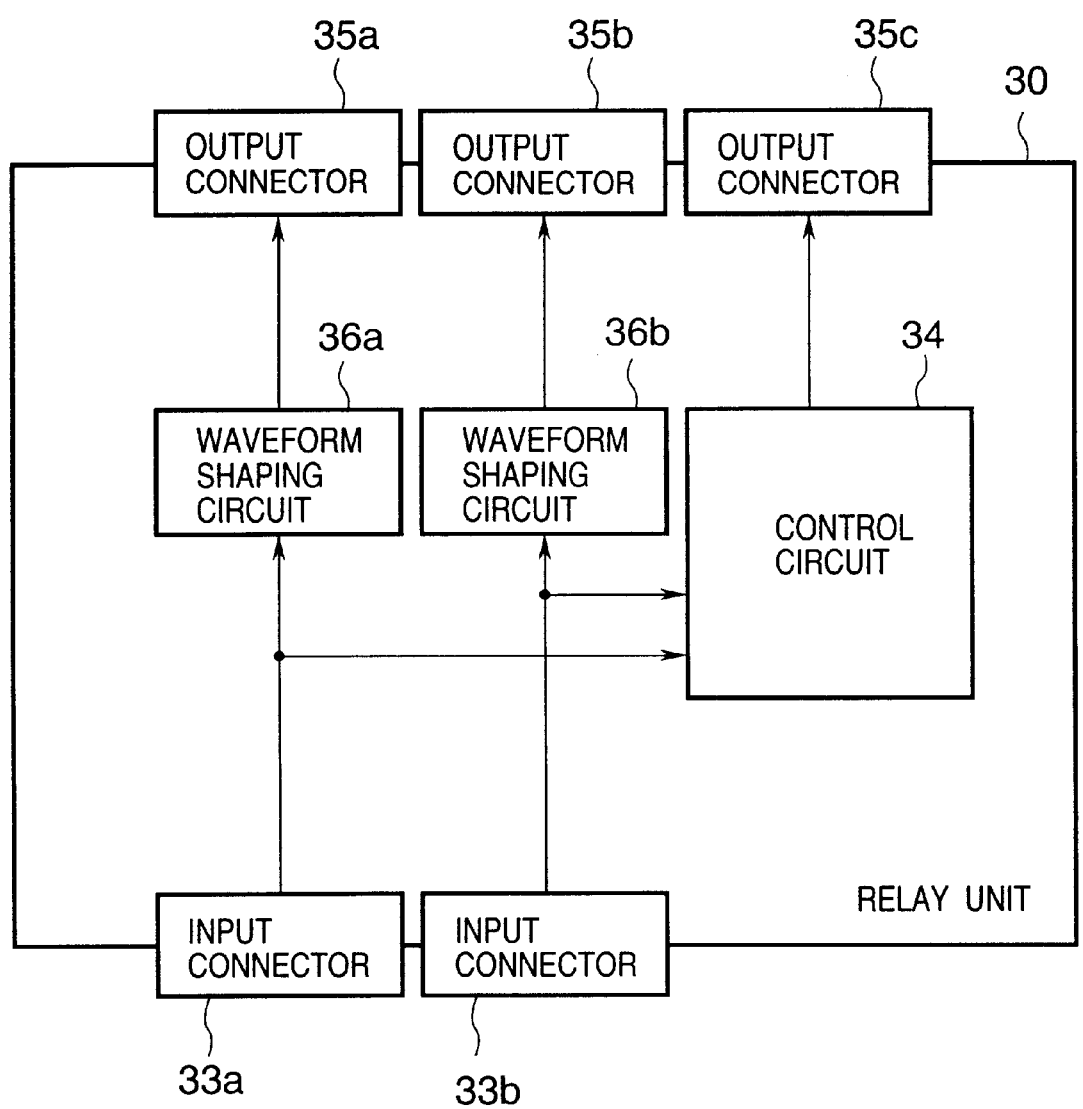
FIG. 12 is a block diagram showing another construction of the relay unit.

Further, if the inverters are away from the relay unit 30 and/or the relay unit 30 is away from the display units, long cables must be used. In this case, as the signals are degraded, waveform shaping circuits 36a and 37b may be provided between the input connectors and the output connectors in the relay unit 30 as shown in FIG. 12, as a simple construction which reliably transmits the signal to the display units.

Third Embodiment

Next, the photovoltaic power generation system according to a third embodiment of the present invention will be described. Note that in the third embodiment, constituents corresponding to those in the first embodiment have the same reference numerals and the explanations of the constituents will be omitted.

In the above-described first and second embodiments, the display unit is connected to the photovoltaic power generation system by electrical connection using the cable. However, as the communication between the inverter and the display unit, radio communication utilizing infrared light, a radio wave and the like, and optical communication via an optical fiber are also possible. In the third embodiment, a method for connecting the display unit to the system by using infrared-ray communication will be described.

[System Construction]

Figure 13:
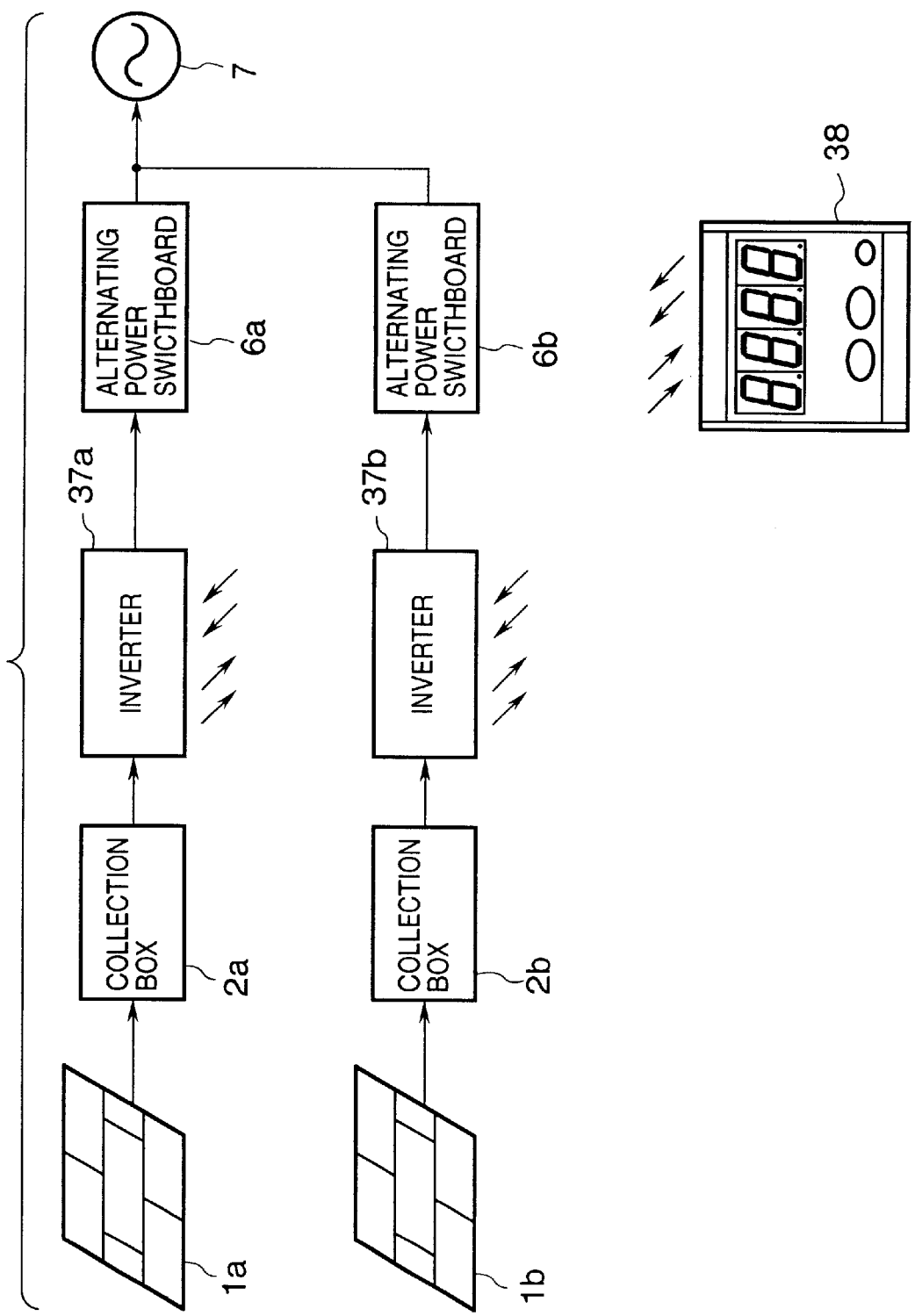
FIG. 13 is a block diagram showing the system-interconnection type photovoltaic power generation system according to a third embodiment of the present invention.

FIG. 13 is a block diagram schematically showing the photovoltaic power generation system according to the third embodiment of the present invention. Numerals 37a and 37b denote inverters respectively including a transmitter and a receiver for infrared-ray communication with a display unit 38. The display unit 38 includes a transmitter and a receiver for transmitting/receiving data on the amounts of power generation in the inverters 37a and 37b by infrared-ray communication. As in the case of the first embodiment, the inverters 37a and 37b are interconnected to the commercial AC power system 7, however, it may be arranged such that alternating outputs from the inverters 37a and 37b are directly supplied to alternating loads.

[Arrangement of Transmitters and Receivers]

Figure 14:
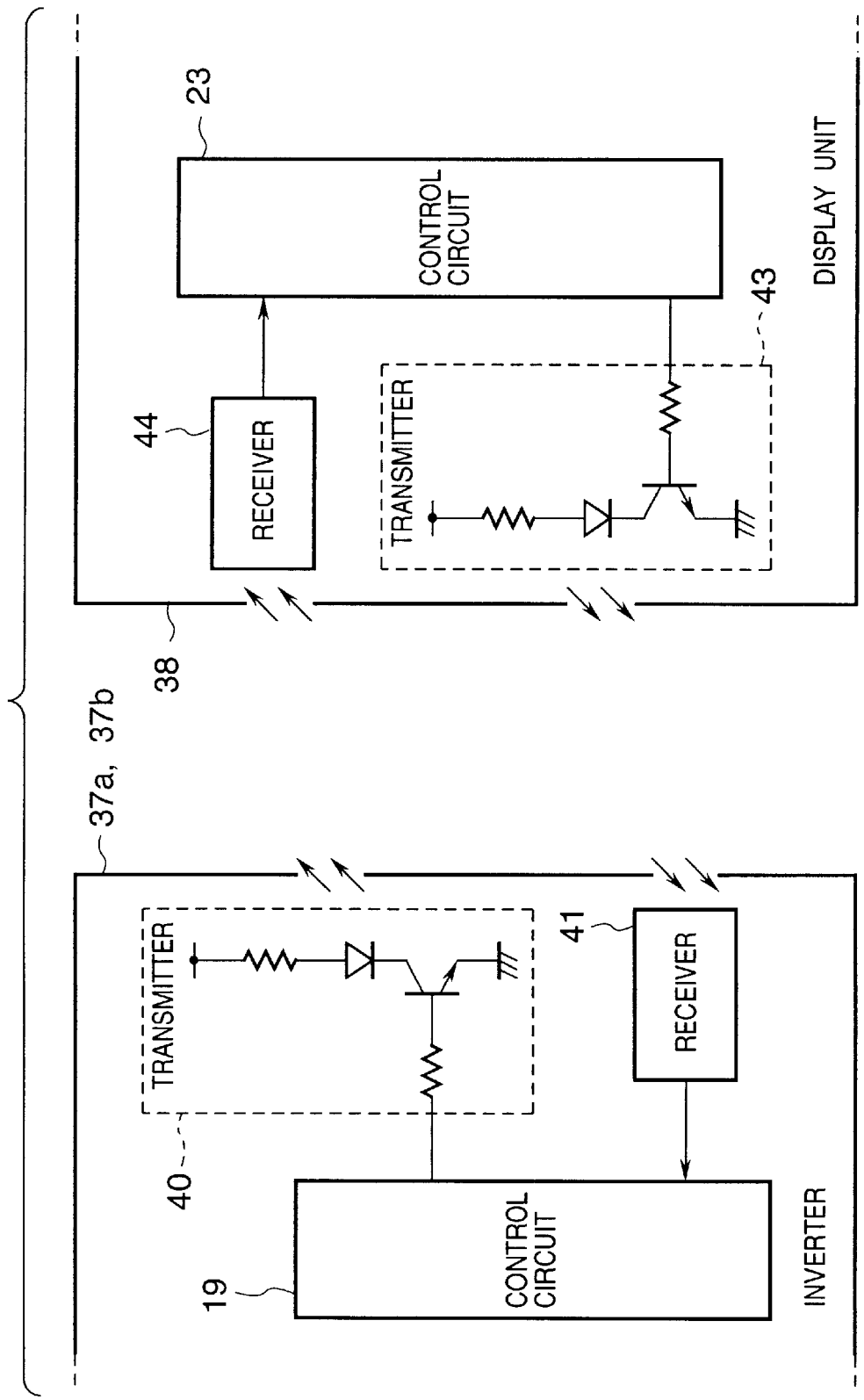
FIG. 14 is a block diagram showing the arrangement of transmitters and receivers of the inverter and the display unit.

FIG. 14 is a block diagram showing the arrangement of transmitters and receivers of the inverters 37a and 37b and the display unit 38. Numeral 40 denotes a transmitter provided in the inverters 37a and 37b; 41, a receiver provided in the inverters 37a and 37b; 43, a transmitter provided in the display unit 38; and 44, a receiver provided in the display unit 38.

In the above arrangement, bidirectional communication by serial transmission using infrared light is performed between the inverters 37a and 37b and the display unit 38. That is, bidirectional communication using address information (ID) of the inverters 37a and 37b is performed, and the display unit 38 manages data on the amounts of power generation received from the inverters 37a and 37b in accordance with the address information. If a power source such as a battery is provided in the display unit 38, the photovoltaic power generation system having the plurality of inverters 3 and a display unit can be easily installed, and the number of the inverters can be easily increased.

Further, if something to block light exists between the inverters and the display unit or the inverters and the display unit are away from each other, the infrared-ray communication is difficult, however, the inverters may be connected to the display unit via an optical fiber. In this arrangement, cable loss due to remote communication can be reduced as much as possible, and the display unit 38 can be easily set in a position away from the inverters 37a and 37b.

Fourth Embodiment

Next, the photovoltaic power generation system according to a fourth embodiment of the present invention will be described. Note that in the fourth embodiment, constituents corresponding to those in the second embodiment have the same reference numerals and the explanations of the constituents will be omitted. The method of transmission of data on the amount of power generation in the fourth embodiment is different from that in the second embodiment. Hereinbelow, the difference will be described.

[Operation of Inverter]

The photovoltaic power generation system of the fourth embodiment transmits a pulse signal which is PWM-modulated as a signal indicative of the amount of power generation (hereinafter referred to as a "power generation amount signal"). Specifically, the power generation amount signal outputted from the inverters 3a and 3b is a pulse signal having a basic frequency of 200 Hz and a duty ratio of 10% to 90%. When the duty ratio is 10%, the pulse signal indicates "0 W"; when the duty ratio is 90%, indicates "4000 W"; and duty ratios between 10% and 90%, indicates values sequentially incremented by 1/200 from the minimum resolution of 20 W.

<Operation of Relay Unit>

Figure 15:
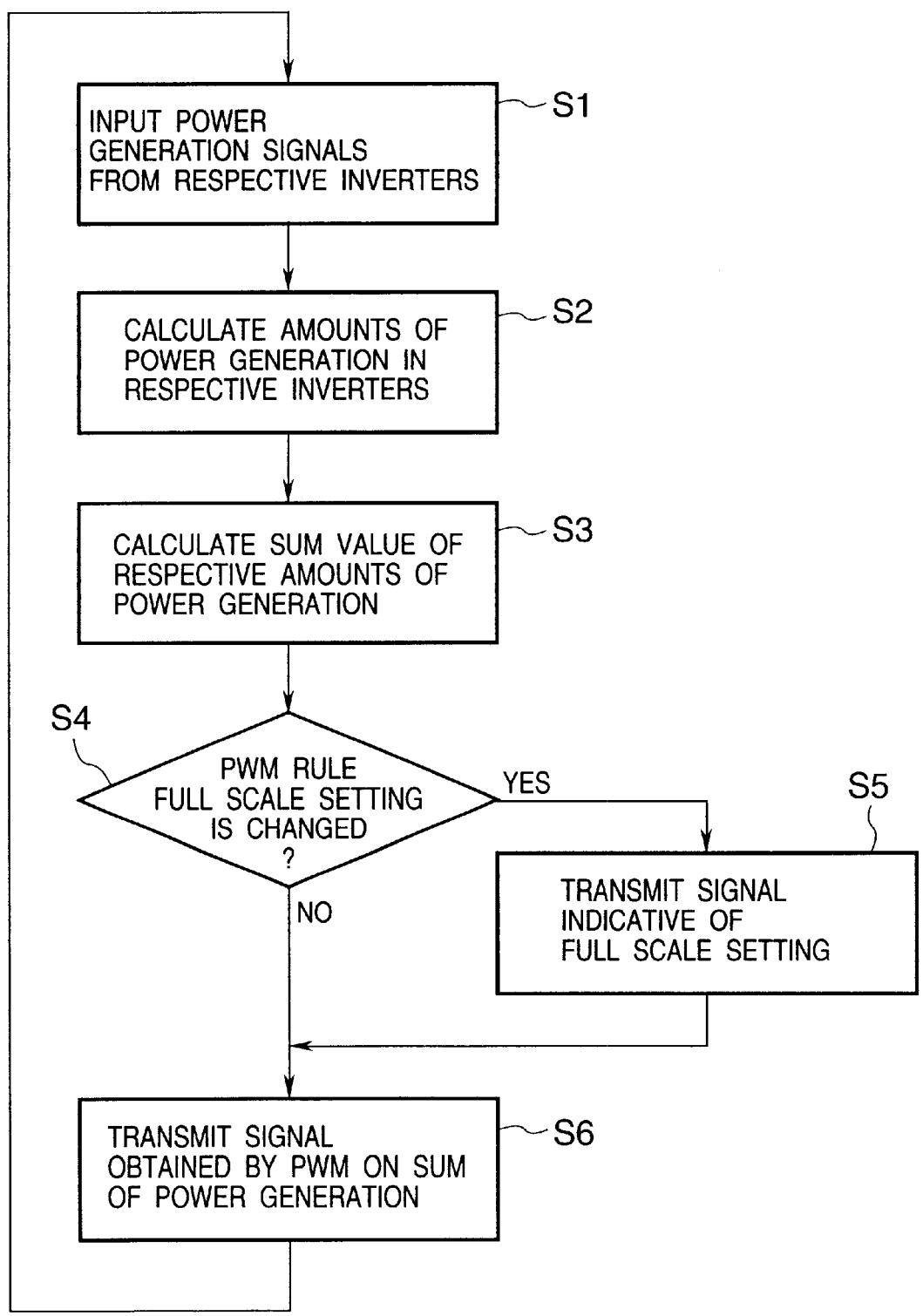
FIG. 15 is a flowchart showing processing performed by the relay unit according to a fourth embodiment of the present invention.

FIG. 15 is a flowchart showing processing performed by the control circuit 34 of the relay unit 30. The power generation amount signals from the inverters 3a and 3b connected to the input connectors 33a and 33b are inputted (at step S1), then the values of power generations are calculated (at step S2) based on the duty ratios of the signals. Next, the sum value of power generation is obtained by adding the amounts of power generation in the inverters 3a and 3b (step S3). Next, the sum value of power generation is compared with full-scale values as shown in FIGS. 16 and 17 (step S4).

In the control circuit 34 of the relay unit 30, four types of full-scale values as shown in FIGS. 16 and 17 are set. If the sum of power generation stands within the currently-used full-scale value, the control circuit 34 performs PWM modulation on the sum of power generation and transmits the value to the display unit 32c (step S6) with the current full-scale setting. Note that in FIG. 17, full-scale setting 1 is the same as the PWM rule in the inverters 3a and 3b.

On the other hand, if the sum of power generation is greater than the currently-used full-scale value, appropriate setting is selected from the full-scale settings as shown in FIG. 16 at step S5. Then a signal indicative of the setting is transmitted for, e.g., one second, to notify the display unit 32c of the new full-scale setting, and the above step S6 is performed.

Conversely, if a part of the plurality of inverters stops, the sum of power generation may be less than the currently-used full-scale value. In such case, accurate information can be transmitted to the display unit 32c by using smaller full-scale setting. Accordingly, it may be arranged such that the full-scale setting is lowered if the duty ratio of the signal transmitted to the display unit 32c is 50% for 10 minutes or longer.

[Operation of Display Unit]

Since the functions related to display and operation of the display units 32a to 32c are the same as those in the second embodiment, the detailed description of the functions will be omitted.

Figure 18:
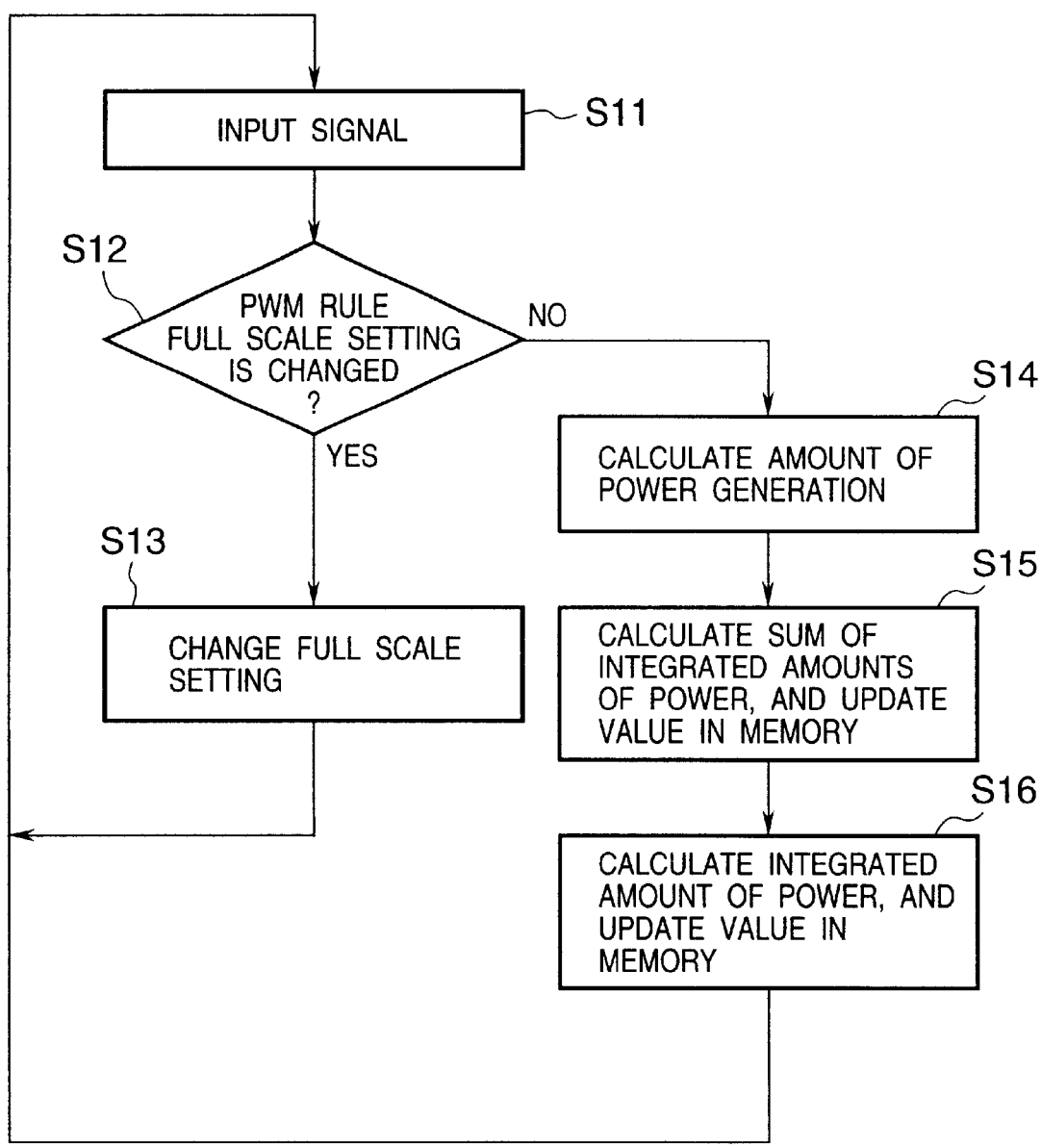
FIG. 18 is a flowchart showing processing by the display unit to obtain the amount of power generation.

The control circuits 23 of the display units 32a to 32c obtain the current sum of power generation in the inverters 3a and 3b from the power generation amount signals sent from the relay unit 30. FIG. 18 is a flowchart showing processing by the control circuit 23 to obtain the amount of power generation.

The control circuit 23 inputs the signal (step S11), and determines whether or not the signal indicates a change in full-scale setting (step S12). If the signal indicates a change in full-scale setting, the control circuit 23 changes the full-scale setting (step S13), and inputs the signal again (step S11).

If the signal does not indicate a change in full-scale setting but the amount of power generation, the control circuit 23 obtains the amount of power generation (step S14) based on the current full-scale setting. Then, the control circuit 23 obtains the sum of integrated amounts of power by integrating the amounts of power generation, and updates the sum of integrated amounts of power stored in the nonvolatile memory in the control circuit 23 (step S15). Similarly, the control circuit 23 integrates the amounts of power generation since the clear switch 26 was operated, to obtain the integrated amount of power, and updates the integrated amount of power stored in the above nonvolatile memory (step S16). Thus, the sum of power generation and the sum of integrated amounts of power in the inverters 3a and 3b that operate independently can be displayed in real time.

In the fourth embodiment, as the relay unit 30 changes the full-scale setting to PWM modulate the amount of power generation in accordance with the sum of power generation, even in a case where the sum value is obtained among the amounts of power generation in a plurality of inverters, the power generation amount signals can be precisely transmitted without causing overflow of the signals. The transmission can be made more effectively as the number of inverters increases.

Further, the power generation amount signals transmitted to the display units 32a and 32b are PWM-modulated based on the full-scale setting 1 as shown in FIG. 17, however, it may be arranged such that in consideration of use of an inverter having a rated output higher than 4 kW, a function to change the full-scale setting of the power generation amount signals is provided in the display units 32a and 32b. In this case, a signal indicative of change in full-scale setting may be sent to the display units 32a and 32b in accordance with the input power generation amount signals, as in the case of the display unit 32c. Further, a function to transmit a signal indicative of change in full-scale setting may be provided in the inverters as in the case of the relay unit 30.

Note that in the above-described first to fourth embodiments, the AC power outputted from the inverter is transmitted as the amount of power generation to the display unit, however, the DC power outputted from the solar cell may be transmitted as the amount of power generation to the display unit. In such case, a DC power detector which detects the DC current and DC voltage inputted from the solar cell into the inverter and calculates the product of these values is required.

Note that in the above-described first to fourth embodiments, the integration is performed on the amounts of power generation in the display unit based on the data on the amounts of power generation received from the inverters, however, it may be arranged such that the control circuit of the inverter performs integration on the amounts of power generation and transmits the integrated amount of power. In this case, in a construction where transmission by radio communication is used as in the case of the third embodiment, even when communication is broken, the integration on the amounts of power can be precisely performed.

As described above, the respective embodiments realize a cost-saving photovoltaic power generation system having a plurality of power control devices (inverters), where the sum of power generation can be displayed in real time, and the user or manager of the photovoltaic power generation system can easily check the sum of power generation. Further, as the power information display device (display unit) to display the amount of power generation receives power supplied from the respective power control devices in parallel, the power information display device can display the amount of power generation and the like while at least one power control device operates.

Further, the construction of the second embodiment can simultaneously display the amounts of power generation and the sum of power generation in the respective power control devices. Further, as a power information display device to be connected to one power control device can be used in the system without any change, the power information display device can be used at a low cost, and the number of power control devices can be increased from one to two or more without wasting the power information display device.

Further, as the radio communication in the third embodiment does not require cable connection between the power control device and the power information display device, operation upon initial setting of the photovoltaic power generation system and installation of additional power control device can be reduced. Further, if an optical fiber is employed as a communication line between the power control device and the power information display device, the power control device and the power information display device can be easily placed away from each other. Further, in use of optical fiber, radiation noise from the communication cable does not occur.

Further, in the construction of the fourth embodiment where the PWM rule full-scale setting is changed in accordance with the amount of power generation, in a case where a PWM-modulated pulse signal is transmitted as a signal indicative of the amount of power generation, the power generation amount signal can be accurately transmitted without causing overflow. The transmission is effective when the number of power control devices is large. Further, even power control devices having different rated outputs can be used in a state where they are connected in parallel.

Further, the information display apparatus, the information relay apparatus to relay the information and the information transmission method according to the present invention is not only applied to a power generation apparatus using solar cells, but may be applied to power generating apparatuses utilizing wind power, water power, geothermal energy and the like.

The present invention can be applied to a system constituted by a plurality of devices such as a host computer, an interface unit, printer etc., or to an apparatus comprising a single device such as a copier. Furthermore, the invention is applicable also to a case where the object of the invention is attained by supplying a program to a system or apparatus. A storage medium, storing a program according to the invention, constitutes the invention. The system or apparatus installed with the program read from the medium realizes the functions according to the invention.

As many apparently widely different embodiments of the present invention can be made without departing from the spirit and scope thereof, it is to be understood that the invention is not limited to the specific embodiments thereof except as defined in the appended claims.

What is claimed is:

1. An information-display apparatus used with a solar power-generation system having plural power-control units, each of which independently operates and converts direct-current power generated by a solar battery to alternating-current power to be provided to a load, said apparatus comprising:

receiving means for receiving information from said plural power-control units, wherein the received information includes at least generated power data which represents output power from each of said plural power-control units;

calculating means for calculating a sum of the output power from all of said plural power-control units; and displaying means for displaying the received information and/or the calculated sum.

2. The apparatus according to claim 1, further comprising plural connectors to receive the information from said plural power-control units.

3. The apparatus according to claim 1, further comprising optical communication means or radio communication means to receive the information from said plural power-control units.

4. The apparatus according to claim 1, wherein said calculating means integrates the output power from each of said plural power-control units and the calculated sum so that said displaying means displays integrated power.

5. The apparatus according to claim 1, wherein said displaying means displays operative status of each of said plural power-control units based on the received information.

6. A solar power-generation apparatus comprising:

plural solar batteries;

plural power-control units, each of which independently operates and converts direct-current power generated by each of said plural solar batteries to alternating-current power to be provided to a load, and outputs information including at least generated power data which represents output power from each of said plural power-control units; and a display unit which displays at least a sum of the output power from all of said plural power-control units based on the information outputted by said plural power-control units.

7. The apparatus according to claim 6, wherein each of said plural power-control units has a power supply for supplying direct-current power to said display unit, and wherein said display unit receives the direct-current power from said plural power-control units in parallel.

8. The apparatus according to claim 6, wherein said display unit has plural connectors to receive the information from said plural power-control units.

9. The apparatus according to claim 6, wherein said display unit has optical communication means or radio communication means to receive the information from said plural power-control units.

10. The apparatus according to claim 6, wherein said display unit can display integrated power which is obtained by integrating the output power from each of said plural power-control units or the sum.

11. The apparatus according to claim 6, wherein said display unit can display operative status of each of said plural power-control units based on the information outputted by said plural power-control units.

12. An information-relay apparatus for relaying information between a solar power-generation unit and plural information-display units, wherein said solar power-generation unit has plural inverters, each of which independently operates and converts direct-current power generated by a solar battery to alternating-current power to be provided to a load, said apparatus comprising:

receiving means for receiving information from said plural inverters, wherein the received information includes at least generated power data which represents output power from each of said plural inverters;

calculating means for calculating a sum of the output power from all of said plural inverters; and outputting means for outputting information, which includes at least data which represents the sum, to said plural information-display units.

13. The apparatus according to claim 12, wherein the information outputted by said outputting means further includes data representing integrated power which is obtained by integrating the output power of each of said plural power-control units or the sum.

14. The apparatus according to claim 12, wherein the information received from said plural inverters further includes status information representing operative status of each of said plural inverters, and said outputting means outputs the received status information as said plural information-display units can distinguish an issuer of the status information.

15. The apparatus according to claim 12, further comprising plural connectors to receive the information from said plural inverters.

16. The apparatus according to claim 12, further comprising plural connectors to output the information to said plural information-display units.

17. The apparatus according to claim 12, further comprising optical communication means or radio communication means to receive the information from said plural inverters.

18. The apparatus according to claim 12, further comprising straighten means for straightening a waveform of a signal which carries the information and is received from said plural inverters, and the straightened signal is outputted to said plural information-display units.

19. A solar power-generation apparatus comprising:

plural solar batteries;

plural inverters, each of which independently operates and converts direct-current power generated by each of said plural solar batteries to alternating-current power to be provided to a load, and outputs information including at least generated power data which represents power outputted from each of said plural inverters;

a relay unit which relays the information outputted from said plural inverters, and calculates and outputs a sum of the output power of all of said plural inverters; and plural display units which respectively display any one of the relayed information and the sum outputted by said relay unit.

20. The apparatus according to claim 19, wherein said relay unit and plural display units respectively have at least one connector to receive the information, and wherein the connectors have the same form.

21. The apparatus according to claim 19, wherein said plural inverters and relay unit respectively have at least one connector to send the information, and wherein the connectors have the same form.

22. The apparatus according to claim 19, wherein each of said plural inverters has a power supply for supplying direct-current power to said relay unit, and said relay unit receives the direct-current power from said plural power-control units in parallel and supplies the received power to said plural display units.

23. The apparatus according to claim 19, wherein said plural display units respectively display integrated power which is obtained by integrating the output power from each of said plural power-control units or the sum.

24. The apparatus according to claim 19, wherein each of said plural inverters further outputs status information representing operative status of itself, and said relay unit relays the received status information such that said plural display units can distinguish an issuer of the status information.

25. The apparatus according to claim 19, wherein said plural inverters and relay unit respectively have optical communication means or radio communication means to communicate the information.

26. The apparatus according to claim 19, wherein said relay unit has straighten means for straightening a waveform of a signal which carries the information and is received from said plural inverters, and the straightened signal is outputted to said plural display units.

27. An information-display method of a solar power-generation system having plural power-control units, each of which independently operates and converts direct-current power generated by a solar battery to alternating-current power to be provided to a load, said method comprising the steps of:

receiving information from the plural power-control units, wherein the received information includes at least generated power data which represents output power from each of the plural power-control units;

calculating a sum of the output power from all of the plural power-control units; and displaying the received information and/or the calculated sum.

28. A computer program product comprising a computer readable medium having computer program code, for an information-display method of a solar power-generation system having plural power-control units, each of which independently operates and converts direct-current power generated by a solar battery to alternating-current power to be provided to a load, said product comprising the process procedure code for:

receiving information from the plural power-control units, wherein the received information includes at least generated power data which represents output power from each of the plural power-control units;

calculating a sum of the output power from all of the plural power-control units; and displaying the received information and/or the calculated sum.

29. An information-relay method of relaying information between a solar power-generation unit and plural information-display units, wherein the solar power-generation unit has plural inverters, each of which independently operates and converts direct-current power generated by a solar battery to alternating-current power to be provided to a load, said method comprising the steps of:

receiving information from the plural inverters, wherein the received information includes at least generated power data which represents output power from each of the plural inverters;

calculating a sum of the output power from all of the plural inverters; and outputting information, which includes at least data representing the sum, to the plural information-display units.

30. A computer program product comprising a computer readable medium having computer program code, for an information-relay method of relaying information between a solar power-generation unit and plural information-display units, wherein the solar power-generation unit has plural inverters, each of which independently operates and converts direct-current power generated by a solar battery to alternating-current power to be provided to a load, said product comprising the process procedure code for:

receiving information from the plural inverters, wherein the received information includes at least generated power data which represents output power from each of the plural inverters;

calculating a sum of the output power from all of the plural inverters; and outputting information, which includes at least data which represents the sum, to the plural information-display units.

31. A transmission method of transmitting information indicating generated power which is outputted from each or all of plural inverters of a solar power-generation apparatus, wherein each of the plural inverters independently operates and converts direct-current power generated by a solar battery to alternating-current power to be provided to a load, said method comprising the steps of:

setting or updating a full-scale value based on a value of the generated power;

modulating a signal as indicating the information, which indicates the generated power, to be transmitted in accordance with the full-scale value; and transmitting the modulated signal.

32. The method according to claim 31, wherein the signal is subjected to pulse width modulation.

33. The method according to claim 31, wherein the signal is transmitted to an information-relay apparatus from the solar power-generation apparatus.

34. The method according to claim 31, wherein the signal is transmitted to an information-display apparatus from an information-relay apparatus.

* * * * *

UNITED STATES PATENT AND TRADEMARK OFFICE
CERTIFICATE OF CORRECTION

PATENT NO.   : 6,311,137 B1
DATED        : October 30, 2001
INVENTOR(S)  : Seiji Kurokami et al.

It is certified that error appears in the above-identified patent and that said Letters Patent is hereby corrected as shown below:

Column 13,
Line 25, "indicates" should read -- it indicates --.
Line 26, "duty ratios" should read -- when the duty ratios are -- and "indicates" should read -- it indicates --.

Signed and Sealed this

Seventh Day of May, 2002

Attest:

JAMES E. ROGAN
*Director of the United States Patent and Trademark Office*

*Attesting Officer*